US010362092B1

(12) United States Patent
Parthasarathy

(10) Patent No.: US 10,362,092 B1
(45) Date of Patent: Jul. 23, 2019

(54) ENTITY MANAGEMENT IN DISTRIBUTED SYSTEMS

(71) Applicant: Nutanix, Inc., San Jose, CA (US)

(72) Inventor: Ranjan Parthasarathy, Milpitas, CA (US)

(73) Assignee: Nutanix, Inc., San Jose, CA (US)

( * ) Notice: Subject to any disclaimer, the term of this patent is extended or adjusted under 35 U.S.C. 154(b) by 18 days.

(21) Appl. No.: 15/294,422

(22) Filed: Oct. 14, 2016

(51) Int. Cl.
G06F 15/16 (2006.01)
H04L 29/08 (2006.01)

(52) U.S. Cl.
CPC .......... *H04L 67/06* (2013.01); *H04L 67/1095* (2013.01); *H04L 67/1097* (2013.01); *H04L 67/28* (2013.01)

(58) Field of Classification Search
CPC .................................................. H04L 45/306
See application file for complete search history.

(56) References Cited

U.S. PATENT DOCUMENTS

| 5,253,252 | A  | 10/1993 | Tobol |
| 5,884,308 | A  | 3/1999  | Foulston |
| 6,363,416 | B1 | 3/2002  | Naeimi et al. |
| 6,684,397 | B1 | 1/2004  | Byer et al. |
| 6,738,801 | B1 | 5/2004  | Kawaguchi et al. |
| 6,928,589 | B1 | 8/2005  | Pomaranski et al. |
| 7,379,419 | B2 | 5/2008  | Collins |
| 7,421,578 | B1 | 9/2008  | Huang et al. |
| 7,461,374 | B1 | 12/2008 | Balint et al. |
| 7,720,864 | B1 | 5/2010  | Muth et al. |
| 7,934,117 | B2 | 4/2011  | Kakivaya et al. |
| 7,937,455 | B2 | 5/2011  | Saha et al. |
| 7,941,470 | B2 | 5/2011  | Le et al. |

(Continued)

FOREIGN PATENT DOCUMENTS

| EP | 1 229 443 A2 | 8/2002 |
| WO | WO 2011078646 A1 | 6/2011 |
| WO | WO 2014200564 A1 | 12/2014 |

OTHER PUBLICATIONS

Final Office Action dated Apr. 20, 2017 for related U.S. Appl. No. 14/708,091.

(Continued)

*Primary Examiner* — Moustafa M Meky
*Assistant Examiner* — Sm Z Islam
(74) *Attorney, Agent, or Firm* — Vista IP Law Group, LLP

(57) ABSTRACT

Systems for managing shared entities between computing clusters while avoiding race conditions. Multiple clusters are interconnected over a network. When a node of a cluster intends to move a shared data item or virtual machine from its cluster to another cluster, the movement or migration can be initiated by establishing sole ownership followed by a request to an arbiter to intermediate during the movement or migration. The request explicitly includes subject entity metadata that describes sharing states pertaining to the subject entity. Upon granting a request, the arbiter generates a master copy of the entity metadata and grants itself read-write access. Any other sharers of the subject entity observe read-only access while the arbiter maintains the sole master copy. A sharer of the subject entity can cause changes to the subject entity through the arbiter. The arbiter can pass ownership to a new cluster to complete the subject entity migration.

25 Claims, 14 Drawing Sheets

(56) References Cited

U.S. PATENT DOCUMENTS

| | | | |
|---|---|---|---|
| 7,990,962 | B2 | 8/2011 | Chang et al. |
| 8,051,252 | B2 | 11/2011 | Williams |
| 8,051,262 | B2 | 11/2011 | Ichikawa et al. |
| 8,219,769 | B1 | 7/2012 | Wilk |
| 8,392,680 | B1 | 3/2013 | Natanzon et al. |
| 8,424,003 | B2 | 4/2013 | Degenaro et al. |
| 8,473,775 | B1 | 6/2013 | Helmick |
| 8,549,518 | B1 | 10/2013 | Aron |
| 8,601,471 | B2 | 12/2013 | Beaty |
| 8,601,473 | B1 | 12/2013 | Aron et al. |
| 8,850,130 | B1 | 9/2014 | Aron et al. |
| 8,898,668 | B1 | 11/2014 | Costea |
| 9,009,106 | B1 | 4/2015 | Aron et al. |
| 9,032,248 | B1 | 5/2015 | Petty |
| 9,286,344 | B1 | 3/2016 | Bhardwaj et al. |
| 9,389,887 | B1 | 7/2016 | Aron et al. |
| 9,772,866 | B1 | 9/2017 | Aron et al. |
| 9,898,522 | B2 * | 2/2018 | Cole ............... G06F 17/30592 |
| 2002/0133491 | A1 | 9/2002 | Sim et al. |
| 2005/0210461 | A1 | 9/2005 | Srivastava et al. |
| 2005/0268298 | A1 | 12/2005 | Hunt et al. |
| 2006/0069912 | A1 | 3/2006 | Zheng et al. |
| 2007/0271561 | A1 | 11/2007 | Winner et al. |
| 2008/0189468 | A1 | 8/2008 | Schmidt et al. |
| 2009/0113034 | A1 | 4/2009 | Krishnappa et al. |
| 2009/0144720 | A1 | 6/2009 | Roush et al. |
| 2009/0290572 | A1 | 11/2009 | Gonia et al. |
| 2010/0042869 | A1 | 2/2010 | Szabo et al. |
| 2010/0110150 | A1 | 5/2010 | Xu et al. |
| 2010/0162226 | A1 | 6/2010 | Borissov et al. |
| 2010/0262717 | A1 | 10/2010 | Critchley |
| 2011/0107135 | A1 | 5/2011 | Andrews et al. |
| 2011/0173493 | A1 | 7/2011 | Armstrong et al. |
| 2011/0184993 | A1 | 7/2011 | Chawla |
| 2012/0078948 | A1 | 3/2012 | Darcy |
| 2012/0117555 | A1 | 5/2012 | Banerjee et al. |
| 2012/0222089 | A1 | 8/2012 | Whelan et al. |
| 2012/0233608 | A1 | 9/2012 | Toeroe |
| 2012/0243795 | A1 | 9/2012 | Head et al. |
| 2012/0254342 | A1 * | 10/2012 | Evans ............... G06F 11/186 709/214 |
| 2012/0266231 | A1 | 10/2012 | Spiers et al. |
| 2012/0317142 | A1 | 12/2012 | Broecheler et al. |
| 2013/0007741 | A1 | 1/2013 | Britsch et al. |
| 2013/0036323 | A1 | 2/2013 | Goose et al. |
| 2013/0054973 | A1 | 2/2013 | Fok et al. |
| 2013/0138995 | A1 | 5/2013 | Sivaramakrishnan et al. |
| 2013/0152077 | A1 | 6/2013 | Leitman et al. |
| 2013/0174246 | A1 | 7/2013 | Schrecker et al. |
| 2013/0219030 | A1 | 8/2013 | Szabo |
| 2013/0227550 | A1 | 8/2013 | Weinstein et al. |
| 2013/0235774 | A1 | 9/2013 | Jo et al. |
| 2013/0304694 | A1 | 11/2013 | Barreto et al. |
| 2013/0332771 | A1 | 12/2013 | Salapura et al. |
| 2014/0052877 | A1 | 2/2014 | Mao |
| 2014/0068612 | A1 | 3/2014 | Torrey |
| 2014/0068711 | A1 | 3/2014 | Schweitzer, III et al. |
| 2014/0089259 | A1 | 3/2014 | Cheng |
| 2014/0101649 | A1 | 4/2014 | Kamble |
| 2014/0109172 | A1 | 4/2014 | Barton et al. |
| 2014/0143831 | A1 | 5/2014 | Fieweger |
| 2014/0222953 | A1 | 8/2014 | Karve et al. |
| 2015/0039763 | A1 | 2/2015 | Chaudhary et al. |
| 2015/0106325 | A1 | 4/2015 | Cole et al. |
| 2015/0205618 | A1 | 7/2015 | Bailey et al. |
| 2015/0244802 | A1 | 8/2015 | Simoncelli |
| 2015/0326531 | A1 | 11/2015 | Cui et al. |
| 2015/0347775 | A1 | 12/2015 | Bie et al. |
| 2016/0034555 | A1 | 2/2016 | Rahut et al. |
| 2016/0077936 | A1 | 3/2016 | Tang et al. |
| 2016/0203008 | A1 | 7/2016 | Cui et al. |
| 2016/0204977 | A1 | 7/2016 | Cui et al. |
| 2016/0359955 | A1 | 12/2016 | Gill et al. |
| 2017/0094002 | A1 * | 3/2017 | Kumar ............... H04L 49/70 |

OTHER PUBLICATIONS

Notice of Allowance and Fee(s) due dated May 15, 2017 for related U.S. Appl. No. 15/069,961.

Non-Final Office Action dated Jan. 26, 2017 for related U.S. Appl. No. 15/069,961.

Non-final Office Action dated Jul. 7, 2015 for related U.S. Appl. No. 14/278,363.

Non-final Office Action dated Jul. 16, 2015 for related U.S. Appl. No. 14/584,466.

International Search Report and Written Opinion dated Aug. 20, 2015, for related PCT Patent Application No. PCT/US15/31096, 8 pages.

International Search Report and Written Opinion dated Aug. 26, 2015, for related PCT Patent Application No. PCT/US15/31096, 8 pages.

Final Office Action dated Feb. 25, 2016 for related U.S. Appl. No. 14/584,466.

Final Office Action dated Mar. 23, 2016 for related U.S. Appl. No. 14/278,363.

Notice of Allowance and Fee(s) due dated Jul. 19, 2016 for related U.S. Appl. No. 14/206,869.

Lamport, Leslie "Paxos Made Simple," dated Nov. 1, 2001, 14 pages.

Alexander Shraer, et al., "Dynamic Reconfiguration of Primary/Backup Clusters," dated 2011, 13 pages.

Notice of Allowance and Fee(s) due dated Oct. 30, 2015 for related U.S. Appl. No. 14/144,520.

Wikipedia, "Compare-and-swap," Nov. 9, 2015, 6 pages.

International Search Report and Written Opinion dated Aug. 7, 2015, for corresponding PCT Patent Application No. PCT/US2015/030026, 10 pages.

Non-final Office Action dated Jul. 17, 2015 for related U.S. Appl. No. 14/206,869.

PCT International Search Report and Written Opinion dated Jun. 15, 2015 for related PCT Patent Application No. PCT/US2015/020139.

Final Office Action dated Jan. 25, 2016 for related U.S. Appl. No. 14/206,869.

Non-final Office Action dated Sep. 22, 2016 for related U.S. Appl. No. 14/584,466.

Citrix, "Citrix XenServer 6.0 Administrator's Guide", Copyright 2012 Citrix Systems, Inc., 207 pages.

John L Hufferd, Hufferd Enterprises, SNIA, "IP Storage Protocols: iSCSI", Copyright 2011 Storage Networking Industry Association, 46 pages.

VMware, Technical White Paper, "Multipathing Configuration for Software iSCST Using Port Binding", Copyright 2012 Vmware, Inc., 15 pages.

Non-final Office Action dated Oct. 7, 2016 for related U.S. Appl. No. 14/278,363.

Notice of Allowance and Fee(s) due dated Oct. 24, 2016 for related U.S. Appl. No. 14/206,869.

Non-final Office Action dated Nov. 1, 2016 for related U.S. Appl. No. 14/708,091.

Final Office Action dated Jan. 9, 2018 for related U.S. Appl. No. 14/610,285.

European Extended Search Report dated Jan. 15, 2018 for related EP Application No. 15762234.1, 19 pages.

Final Office Action dated Feb. 27, 2018 for related U.S. Appl. No. 14/708,091.

Notice of Allowance and Fee(s) due dated Apr. 5, 2017 for related U.S. Appl. No. 14/584,466.

Ajmani et al., "Scheduling and Simulation: How to Upgrade Distributed Systems," HotOS IX: The 9th Workshop on Hot Topics in Operating Systems, USENIX, 2003, pp. 43-48.

Kochut, Andrzej and Alexei Karve, "Leveraging Local Image Redundancy for Efficient Virtual Machine Provisioning," 2012 IEEE Network Operations and Management Symposium, Jun. 8, 2012, pp. 179-187.

Soules et al.; "Metadata Efficiency in a Comprehensive Versioning File System", May 2002, CMU-CS-02-145, School of Computer Science, Carnegie Mellon University, Pittsburgh, PA 15213, 33 pages.

(56) References Cited

OTHER PUBLICATIONS

Notice of Allowance and Fee(s) due dated Apr. 10, 2017 for related U.S. Appl. No. 14/278,363.
Non-Final Office Action dated Jul. 12, 2017 for related U.S. Appl. No. 14/610,285.
European Search Report dated May 5, 2017 for related EP Application No. 15792334.3, 13 pages.
European Search Report dated May 19, 2017 for related EP Application No. 15788922.1, 11 pages.
Non-Final Office Action dated Aug. 24, 2017 for related U.S. Appl. No. 14/708,091.
Non-Final Office Action dated Jun. 29, 2018 for related U.S. Appl. No. 15/160,347.
First Office Action dated Jul. 30, 2018 for related European Application No. 15762234.1, 6 pages.
Advisory Action dated May 18, 2018 for related U.S. Appl. No. 14/708,091.
Notice of Allowance dated Sep. 6, 2018 for related U.S. Appl. No. 14/708,091, 8 pages.
Non-Final Office Action dated Nov. 14, 2018 for related U.S. Appl. No. 15/678,893, 7 pages.
Intention to Grant dated Jan. 3, 2019 for related EP Application No. 15792334.3, 7 pages.
Final Office Action dated Jan. 28, 2019 for related U.S. Appl. No. 15/160,347, 16 pages.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Notice of Allowance dated Mar. 20, 2019 for related U.S. Appl. No. 15/678,893, 5 pages.

* cited by examiner

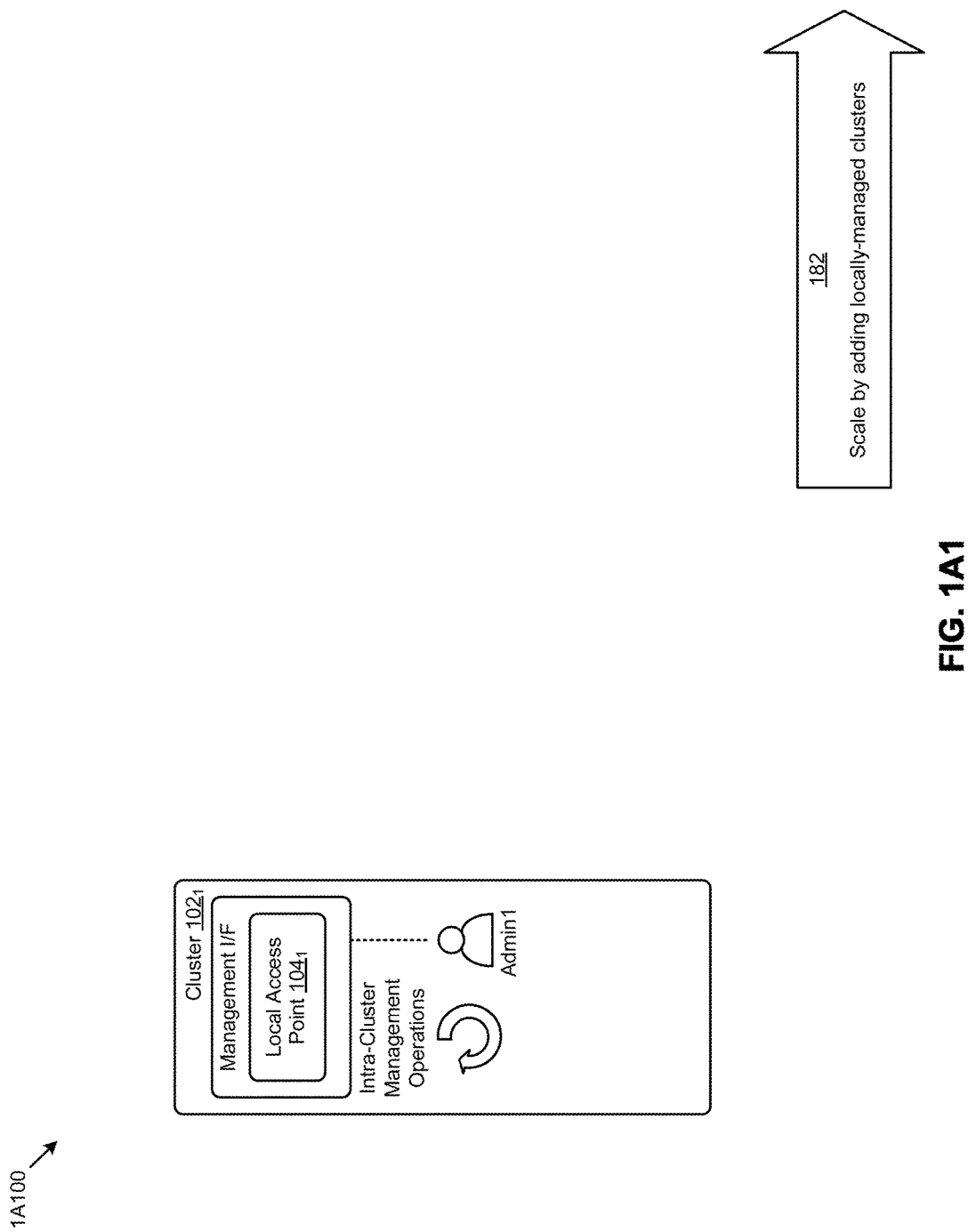

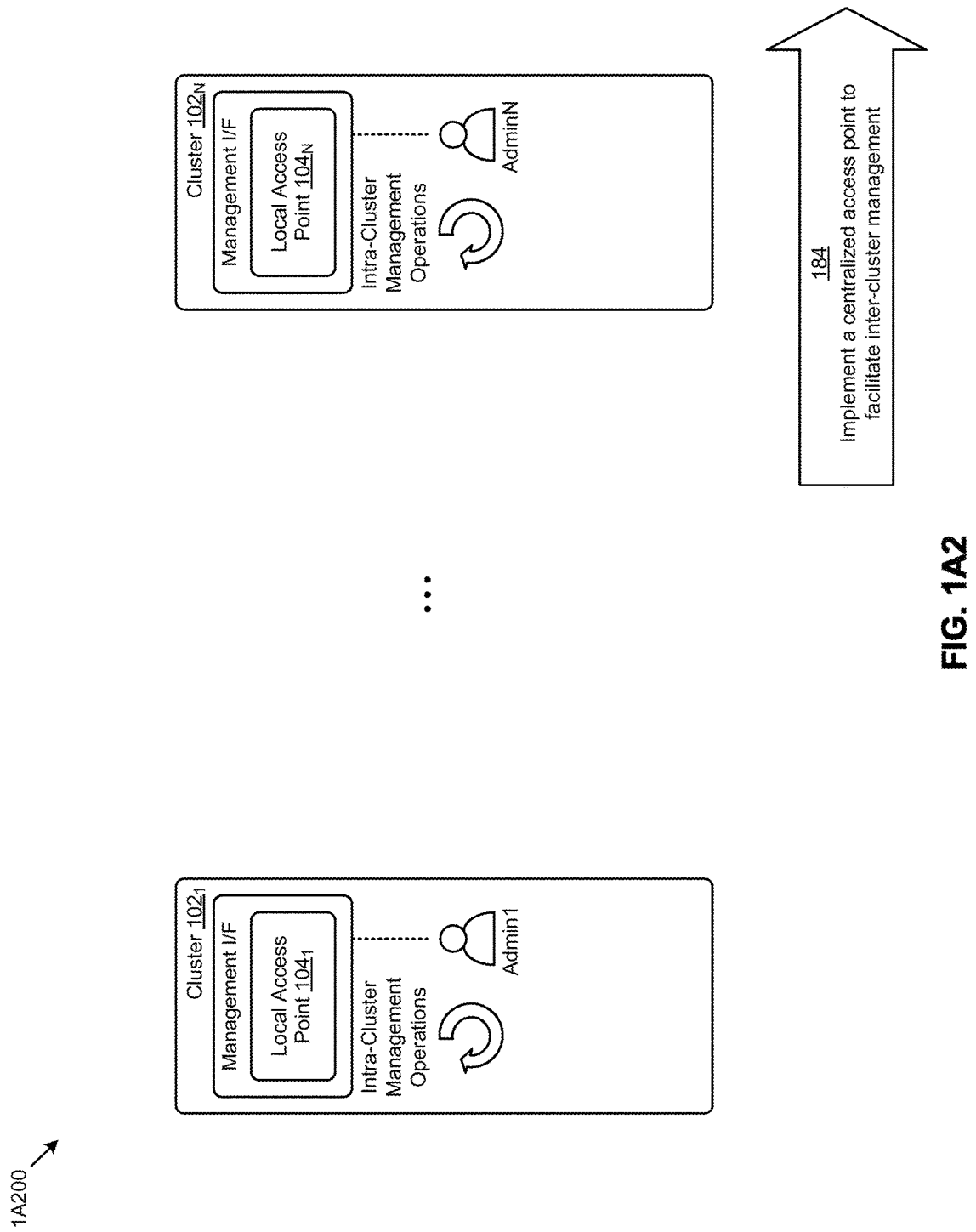
FIG. 1A2

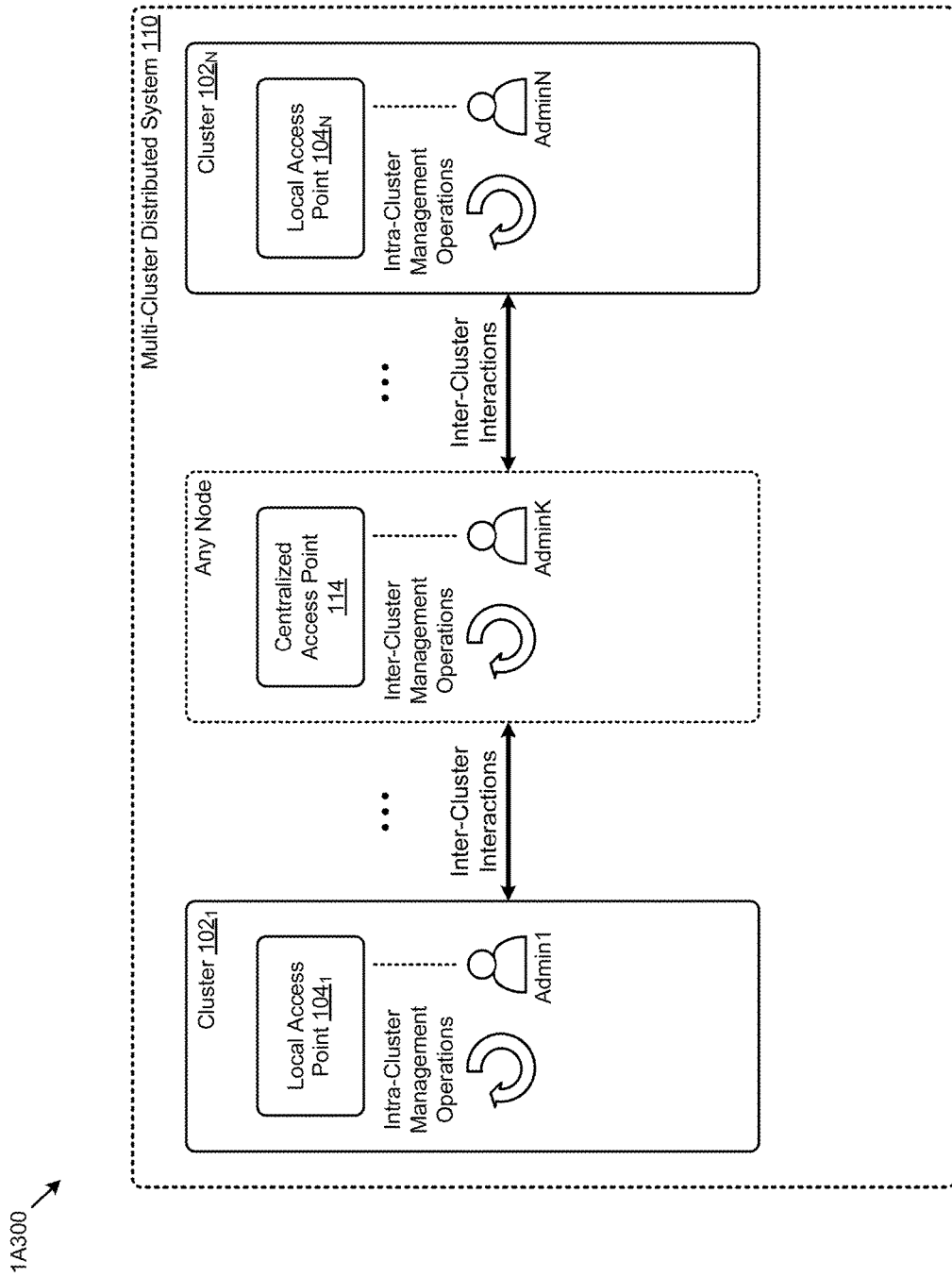
FIG. 1A3

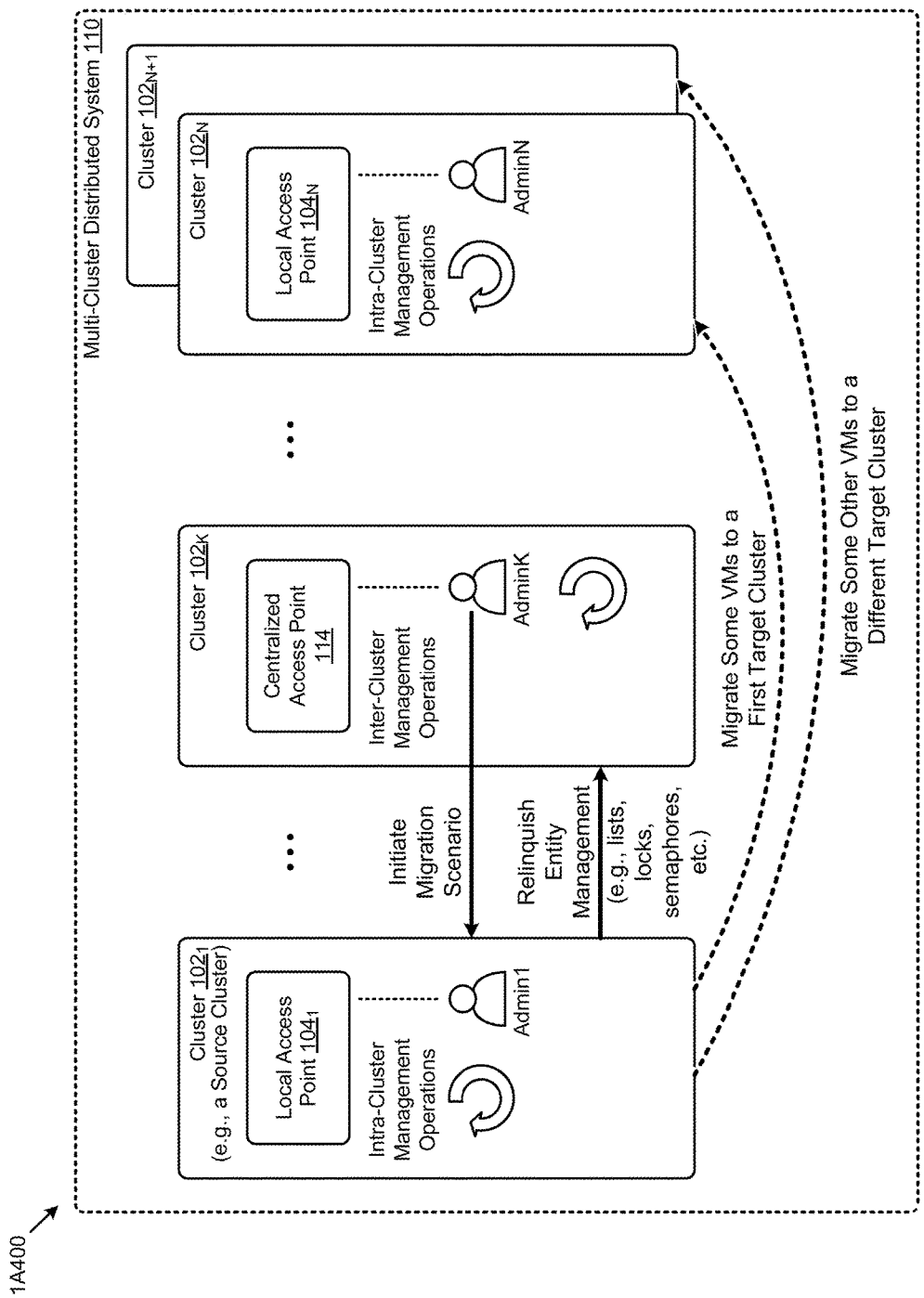
FIG. 1A4

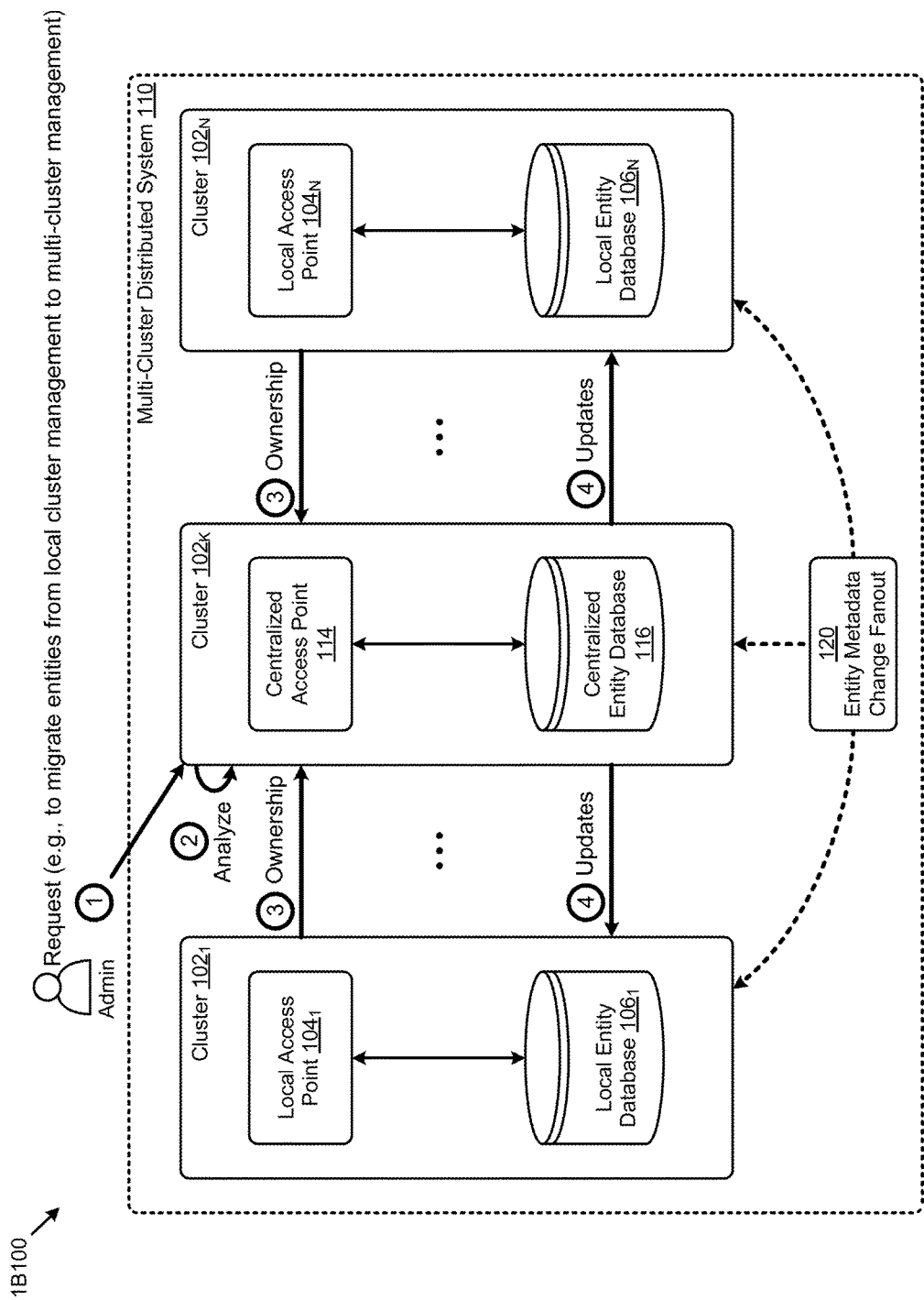
FIG. 1B1

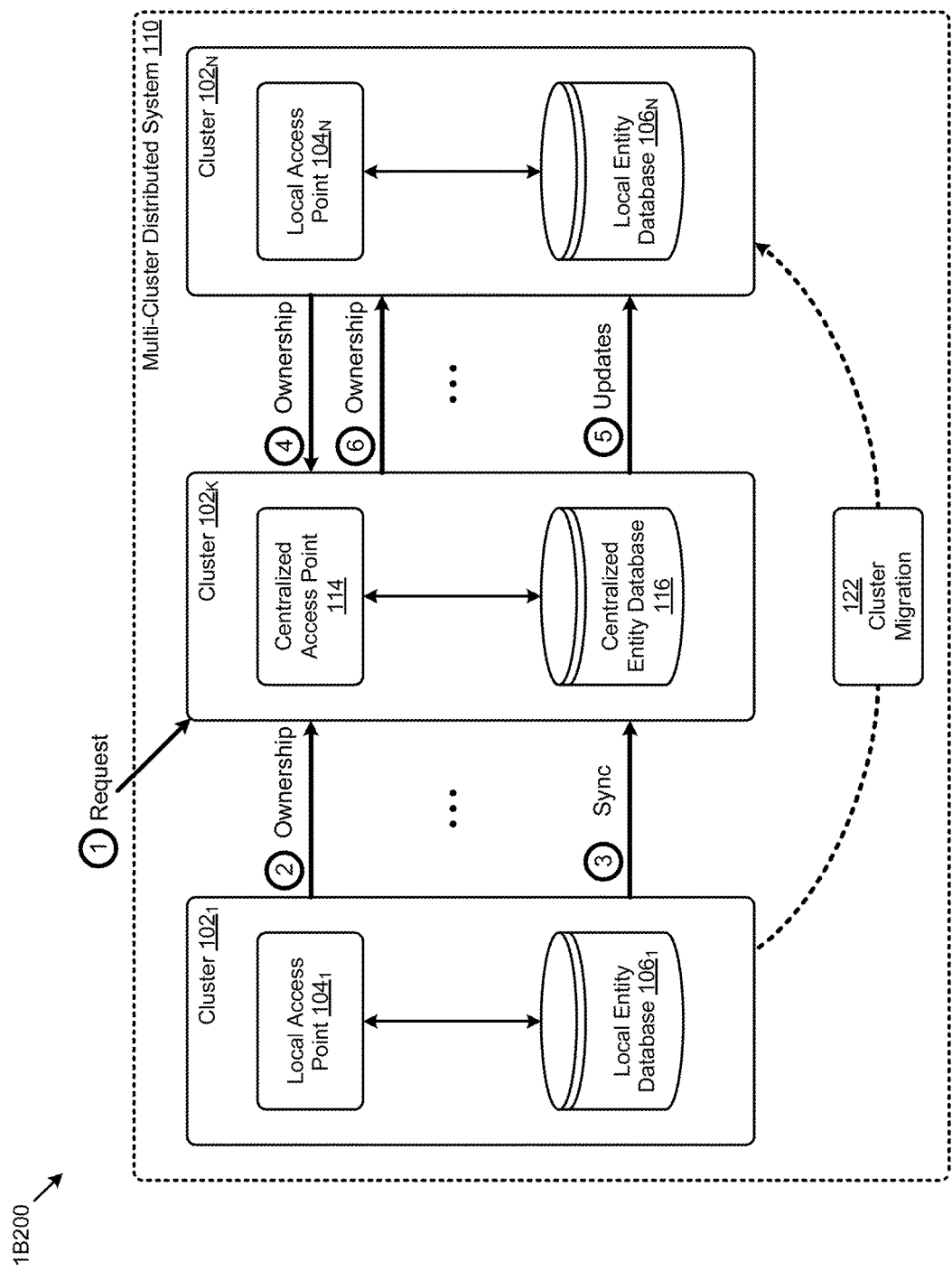
FIG. 1B2

ENTITY MANAGEMENT IN DISTRIBUTED SYSTEMS

FIELD

This disclosure relates to distributed data storage, and more particularly to techniques for synchronized entity management in multi-cluster distributed systems.

BACKGROUND

Modern hyper-converged distributed virtualization systems comprise components that coordinate to share sets of computing resources, data storage facilities, and networking facilities that are integrated into clusters. Such distributed systems have evolved in such a way that incremental linear scaling can be accomplished in many dimensions. Certain clusters in a distributed system might support over one hundred nodes that in turn support as many as several thousands (or more) autonomous computing-related entities. Such entities might be or be subsumed by virtual machines (VMs), application containers, storage devices, and/or other components in the distributed system. Metadata characterizing aspects of the entities can be implemented in the distributed system to manage the entities. For example, the metadata can be used to operate on the entities (e.g., create or configure a VM, etc.) and/or monitor certain aspects of the entities (e.g., changes, accesses, permissions, etc.). Various access points (e.g., management interface) in a distributed system can be provided to perform entity management (e.g., configuration, monitoring, analyzing, etc.). A virtualized controller on one of many nodes in a given cluster might be elected as the access point (e.g., as an elected leader) for managing the cluster entities. In this case, the elected virtualized controller will have permissions as owner to modify the entity metadata.

Unfortunately, legacy techniques for managing entity metadata present limitations at least as pertaining to efficiently and accurately managing cross-cluster entities in a multi-cluster distributed environment. Legacy approaches that use access points at each cluster can introduce metastability of data or corruption of data when transitioning (e.g., scaling) from a single cluster implementation to a multi-cluster implementation. For example, in systems having multiple access points (e.g., at each cluster) legacy approaches can introduce inconsistencies (e.g., conflicts, inaccuracies, etc.) in the metadata for entities that have cross-cluster associations. Certain other legacy approaches might implement a single centralized access point for the multi-cluster system while disabling all other access points. Such approaches are inefficient, at least inasmuch as during the timeframe that all other access points are disabled, progress may be halted. Further, legacy approaches fail to consider certain physical variables or constraints (e.g., geographic distances or boundaries), and also fail to consider policy restrictions (e.g., cross-cluster restrictions), performance variables (e.g., latency), and/or other constraints when managing entities that are shared across two or more clusters.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for synchronized entity management in multi-cluster distributed systems, which techniques advance the relevant technologies to address technological issues with legacy approaches. More specifically, the present disclosure provides a detailed description of techniques used in systems, methods, and in computer program products for synchronized entity management in multi-cluster distributed systems. Certain embodiments are directed to technological solutions for implementing an atomic ownership control protocol to manage cross-cluster entity metadata from multiple access points in a multi-cluster distributed system.

The disclosed embodiments modify and improve over legacy approaches. In particular, the herein-disclosed techniques provide technical solutions that address the technical problems attendant to efficiently and accurately managing cross-cluster entities in a multi-cluster distributed environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication, all while managing access to shared objects. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to managing computing and storage tasks in multi-cluster computing environments.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A1, FIG. 1A2, and FIG. 1A3 depict a sequence of states pertaining to a transition of a single-cluster distributed system to a multi-cluster distributed system, according to some embodiments.

FIG. 1A4 depicts an example pertaining to a transition to a multi-cluster distributed system, according to an embodiment.

FIG. 1B1 illustrates a centralized entity ownership transfer technique as implemented in systems that facilitate synchronized entity management in multi-cluster distributed systems, according to an embodiment.

FIG. 1B2 illustrates a local entity ownership transfer technique as implemented in systems that facilitate synchronized entity management in multi-cluster distributed systems, according to an embodiment.

FIG. 2 presents a multi-cluster distributed environment in which embodiments of the present disclosure can operate.

FIG. 3 is an interaction diagram showing an inter-component protocol that facilitates centralized entity management using an entity ownership transfer from local access points to a centralized access point as implemented in systems for synchronized entity management in multi-cluster distributed systems, according to an embodiment.

FIG. 4 is a diagrammatic representation of system component interactions that facilitates entity ownership transfer from a centralized access point to a local access point as implemented in systems for synchronized entity management in multi-cluster distributed systems, according to an embodiment.

DETAILED DESCRIPTION

Figure 1C:
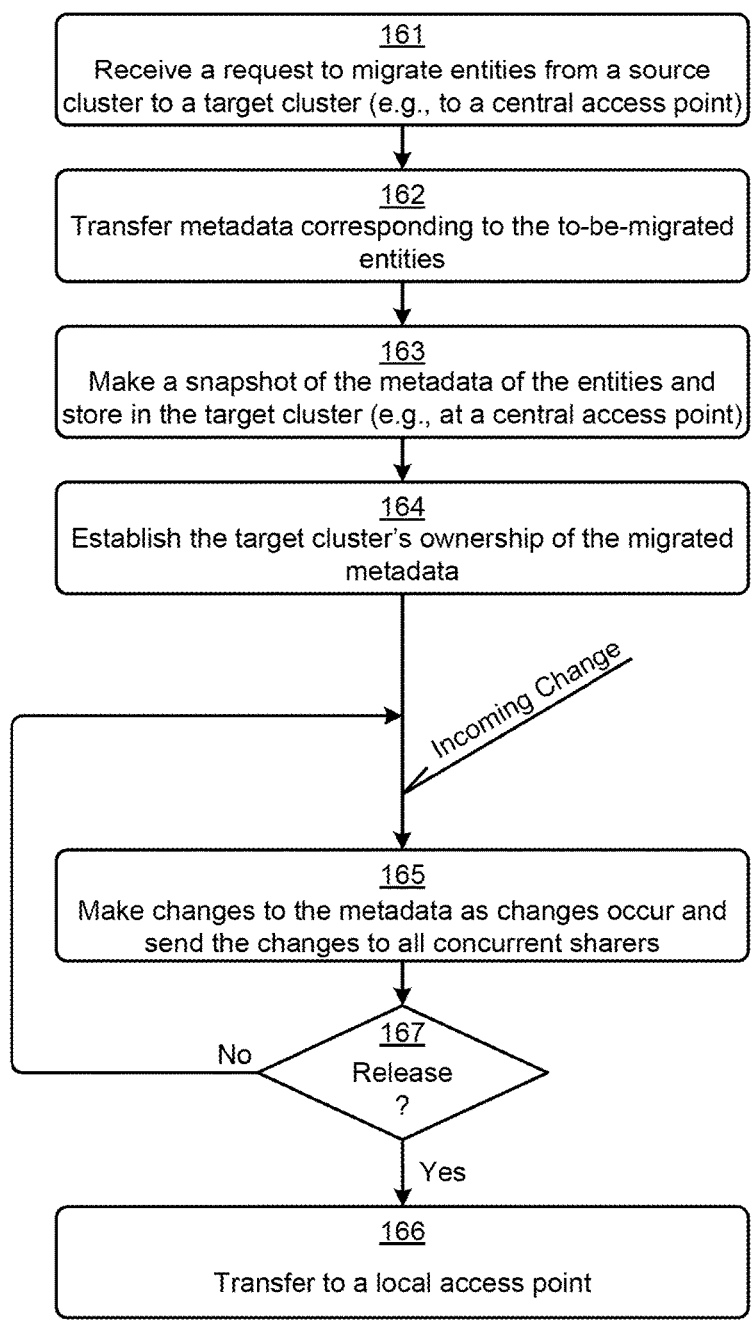
FIG. 1C is a flowchart of operations as implemented in systems that facilitate synchronized entity management in multi-cluster distributed systems, according to an embodiment.

Embodiments of the present disclosure address the problem of efficiently and accurately managing cross-cluster entities in multi-cluster distributed computing environments. Some embodiments are directed to approaches for implementing an atomic ownership control protocol to manage cross-cluster entity metadata from multiple access points in a multi-cluster distributed system. The accompanying figures and discussions herein present example environments, systems, methods, and computer program products for synchronized entity management in multi-cluster distributed systems.

Overview

Disclosed herein are techniques for implementing an atomic ownership control protocol to manage cross-cluster entity metadata that is accessible from multiple access points in a multi-cluster distributed system. In certain embodiments, the local entity metadata for each cluster in the multi-cluster distributed system is synchronized to a centralized entity database owned by an arbiter at centralized access point. When a change to the entity database is requested, ownership control of the associated subject entity metadata is transferred from a current access point (e.g., local cluster controller) to the centralized access point using atomic (e.g., compare-and-swap) operations. The ownership transfer renders the local instance of the subject entity metadata immutable. The centralized owner can then update the subject entity metadata at the centralized entity database and local instance of the entity database. In certain embodiments, the foregoing ownership transfer protocol and metadata update can be executed for all instances of the subject entity metadata in a broadcast or fan out operation. In other embodiments, ownership control can be transferred from the centralized access point to one or more local access points.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1, FIG. 1A2, and FIG. 1A3 depict a sequence of states (e.g., state 1A100, state 1A200, and state 1A300, respectively) pertaining to a transition of a single-cluster distributed system to a multi-cluster distributed system. The multi-cluster distributed system shown in FIG. 1A3 comprises two clusters depicted as local access points and a third cluster deployed as a centralized access point. As an option, one or more variations of state 1A100, state 1A200, and/or state 1A300, or any aspect thereof may be implemented in the context of the architecture and functionality of the embodiments described herein. The foregoing states or any aspect thereof may be implemented in any environment.

As shown in state 1A100 in FIG. 1A1, a certain resource owner (e.g., an enterprise) might manage a cluster $102_1$ comprising various resources, such as virtualized entities (e.g., virtual machines or VMs, containers, etc.), compute and storage nodes, and/or other resources. The enterprise might assign responsibility to one or more users (e.g., Admin1) to manage the configuration of cluster $102_1$ so as to satisfy certain compute and/or storage demands at some specified level of performance. To facilitate such cluster management, a local access point $104_1$ operating, for example, a cluster management application can be accessed by Admin1 to perform various intra-cluster management operations. As the enterprise grows, the enterprise may want to scale its compute and storage capacity by adding additional locally-managed clusters (operation 182).

Figure 2:
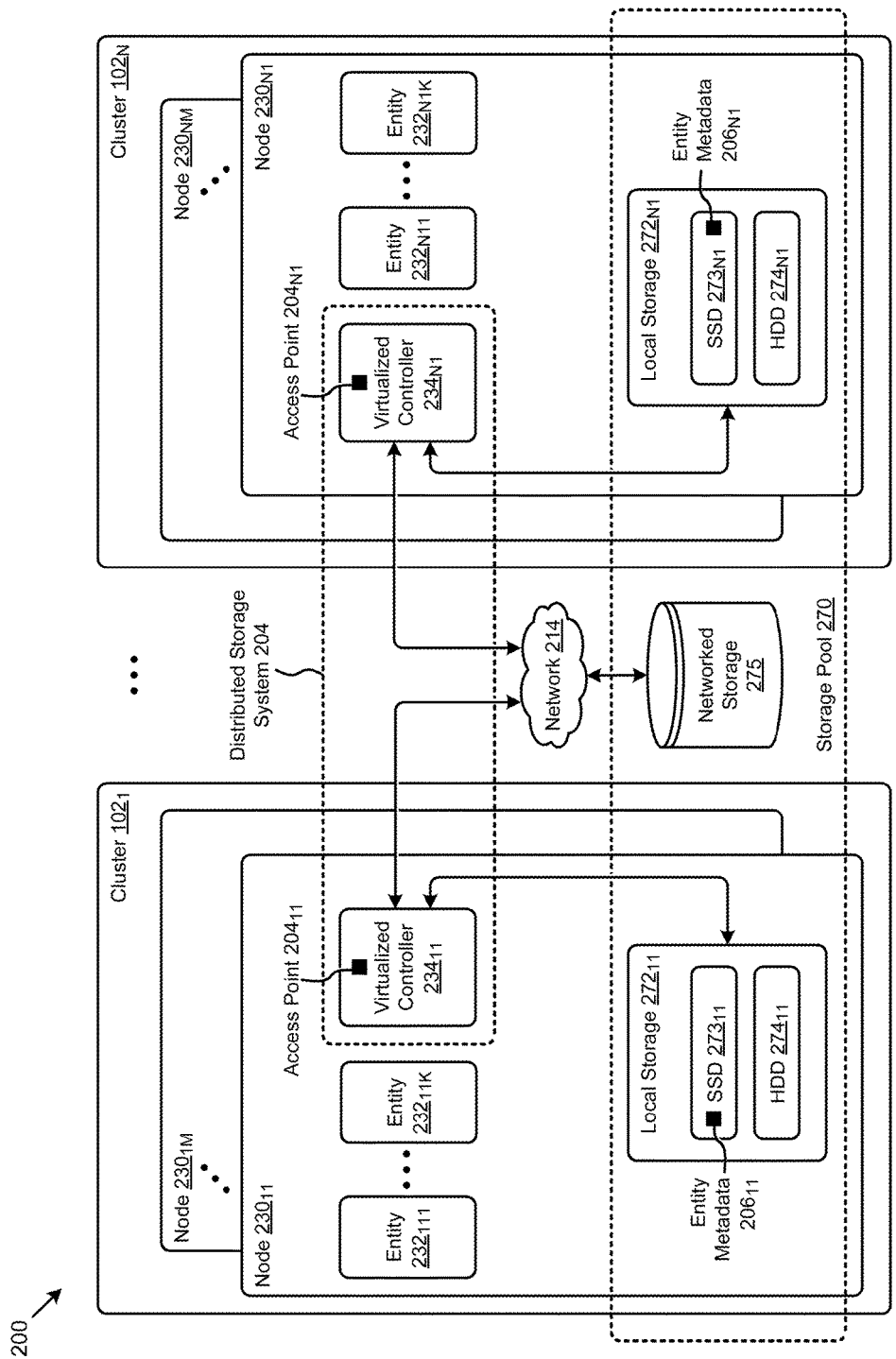

Specifically, as shown in state 1A200 in FIG. 1A2, one or more clusters (e.g., cluster $102_N$) can be added by the enterprise. In some cases, each of the clusters might be managed by a local administrator (e.g., AdminN) by accessing its cluster-specific instance of a local access point (e.g., local access point $104_N$) through a management interface (e.g., the shown management I/F) to perform various intra-cluster management operations. For example, the local administrators might perform intra-cluster operations such as VM migration, container migration, VM sizing, and/or other entity management operations.

As the number of clusters increases, the enterprise might want to implement a centralized access point to facilitate inter-cluster management (operation 184). Specifically, as shown in state 1A300 in FIG. 1A3, a node (e.g., any node on any cluster) might be selected to host a central access point (e.g., centralized access point 114) that is accessed by an administrator (e.g., AdminK). The clusters that now comprise a multi-cluster distributed system 110 can register with the centralized access point 114 to facilitate various inter-cluster management operations. Issues can arise from concurrent access to entity metadata by AdminK at the centralized access point 114 and any of the local administrators. For example, an operation to migrate a VM from cluster $102_1$ to cluster $102_N$ might be invoked by AdminK at the centralized access point 114. In this case, the operation might present access conflicts with other operations invoked at one or more of the local access points.

Figure 4:
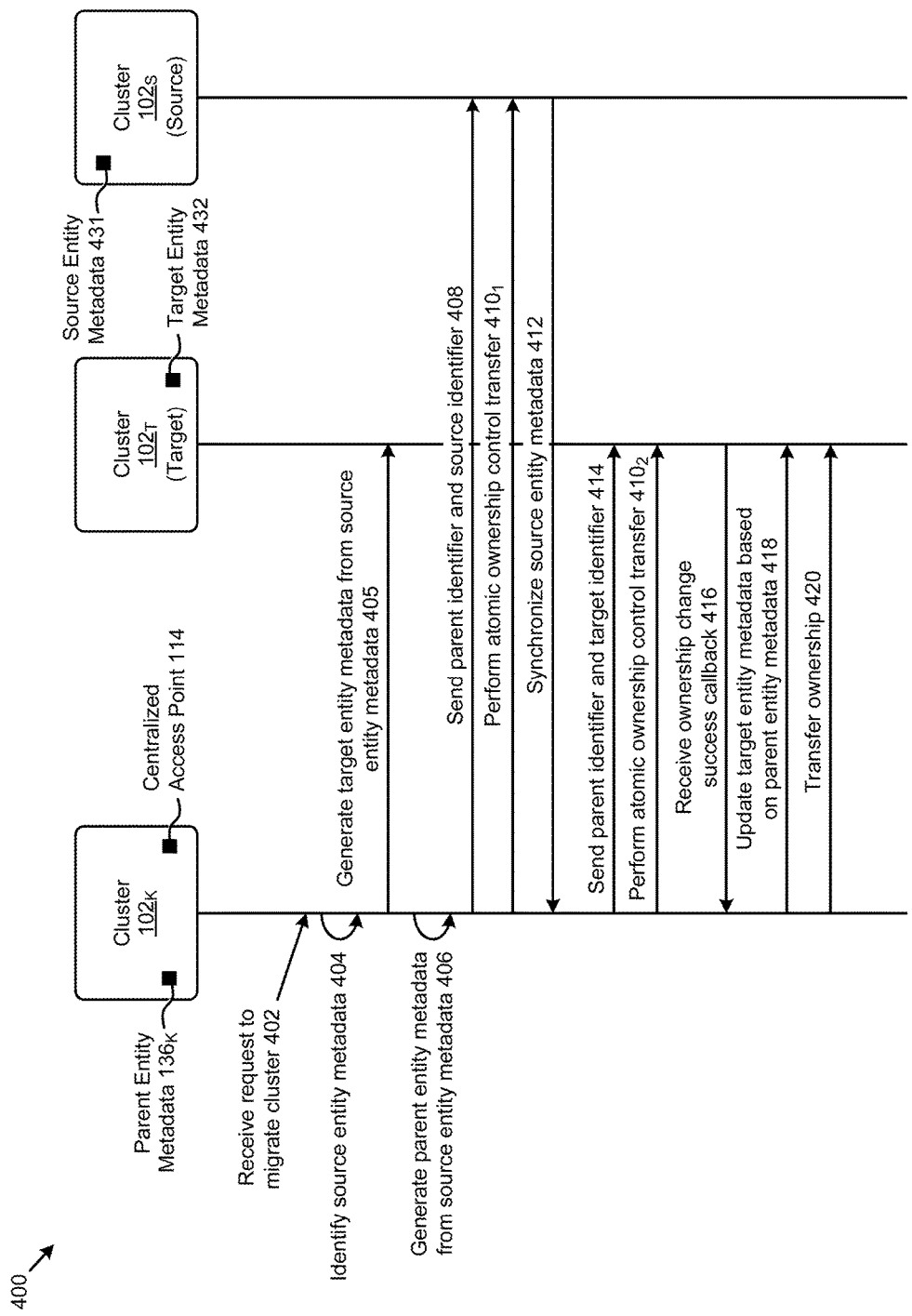

FIG. 1A4 depicts an example pertaining to a transition to a multi-cluster distributed system. FIG. 1A4, shows operations to migrate a first set of VMs and respective assets from cluster $102_1$ to cluster $102_N$, and an operation to migrate a different set of VMs and respective assets from cluster $102_1$ to cluster $102_{N+1}$. The transition might be initiated by AdminK at the centralized access point 114. Strictly as an example, suppose that the first set of VMs to be migrated to cluster $102_N$ includes a (for example) a first personnel file access application and suppose that the second set of VMs to be migrated to cluster $102_{N+1}$ includes a (for example) a second personnel file access application. Further suppose that a database or file (for example the aforementioned personnel file) was managed for concurrent access using locks managed within the to-be migrated cluster. In a case where the migration involved multiple clusters, then the locks and/or other entities and/or the metadata pertaining to the locks and/or other entities would need to be moved and managed at a central location, at least during the performance of the migration between clusters. The centralized access point 114 of cluster $102_K$ serves such a purpose, at least inasmuch as the centralized access point 114 can serve as an arbiter for any accesses by any cluster to the to-be-migrated entities.

An operation to migrate a group of VMs from cluster $102_1$ to cluster $102_N$ might be initiated by AdminK using a management interface pertaining to the centralized access point 114. Cluster $102_1$ would respond to the migrate operation by relinquishing its localized entity management by passing ownership and management responsibilities to the cluster $102_K$. In some cases and as shown, entities from a source cluster might be distributed to several other target clusters. Further, the source cluster might be in one geography and the target clusters in two other geographies. Still further, the motivation for the distribution of the entities might be to decommission a cluster. For example, suppose a source cluster is located in geography having an office that is to be moved from that geography to two other geographies. Further suppose that some of the personnel will transfer from the source geography to one of the two target geographies. In such a case the personnel file comprising personnel records for the affected employees might need to be sharded or otherwise distributed to two clusters the two respective target geographies. During the time of the sharding, at least until the time that the sharding has completed, some entities and/or metadata pertaining to entities would need to be shared between at least the two target geographies. When the migration to the two target clusters is complete, the entities that are now under arbitration by the centralized access point are managed so as to avoid race conditions or overwrite conditions. The source cluster can be decommissioned, leaving the two target clusters to manage their respective VMs over their respective shards, using the centralized access point as an arbiter.

The herein disclosed techniques address the foregoing problems attendant to efficiently and accurately managing entities in a multi-cluster distributed environment. A centralized entity ownership transfer technique is shown and described as pertaining to FIG. 1B1.

FIG. 1B1 illustrates a centralized entity ownership transfer technique 1B100 as implemented in systems that facilitate synchronized entity management in multi-cluster distributed systems. As an option, one or more variations of centralized entity ownership transfer technique 1B100 or any aspect thereof may be implemented in the context of the architecture and functionality of the embodiments described herein. The centralized entity ownership transfer technique 1B100 or any aspect thereof may be implemented in any environment.

Shown in FIG. 1B1 are representative clusters (e.g., cluster $102_1$, cluster $102_K$, and cluster $102_N$) in a multi-cluster distributed system 110. Cluster $102_1$ and cluster $102_N$ each have an entity database (e.g., local entity database $106_1$ and local entity database $106_N$, respectively) to store metadata describing the entities (e.g., VMs, containers, storage facilities, processes, etc.) in the cluster. The entity databases can be accessed by local access points (e.g., local access point $104_1$ and local access point $104_N$, respectively) to manage (e.g., modify) the entity metadata in the entity databases. For example, an elected leader controller from one of the nodes of a given cluster might serve as the access point for the cluster. In a single cluster system, the entity metadata can be managed by a single instance of the local access point. In multi-cluster distributed systems and environments, such as multi-cluster distributed system 110, users (e.g., system administrator) might desire visibility into certain aspects (e.g., topology, operation, performance, etc.) of the entire multi-cluster distributed system to facilitate, for example, scaling of the system. Such a centralized view and/or access can be facilitated as shown by a centralized access point 114 and a centralized entity database 116 implemented in a selected cluster (e.g., cluster $102_K$). Such centralized components can further serve to manage entities in multi-cluster distributed system 110 that have cross-cluster associations. For example, an application created on cluster $102_1$ might, over time, have an associated application database distributed over multiple clusters (e.g., cluster $102_K$, . . . , cluster $102_N$). In such cases, managing the entities and/or the multiple access points in multi-cluster distributed system 110 so as to prevent conflicts and/or inconsistencies can present challenges.

Such challenges are addressed by the herein disclosed techniques for implementing an atomic ownership control protocol to manage cross-cluster entity metadata that is accessible from multiple access points in a multi-cluster distributed system. Specifically, FIG. 1B1 illustrates the implementation of the disclosed techniques (e.g., comprising centralized entity ownership transfer technique 1B100) to facilitate an entity metadata change fan out operation (operation 120). More specifically, a request for arbitration might be received at centralized access point 114 of cluster $102_K$ to modify a set of subject entity metadata in multi-cluster distributed system 110 (step 1). The request can be analyzed to determine if the request is associated with any cross-cluster entity metadata (step 2). For example, certain entities might be cross-cluster entities such as are often present when running a multi-tier application. Strictly as one example, a multi-tier application might comprise a database server running on one cluster, and a set of web servers or other services running on another cluster. If the request pertains to merely a single cluster, the arbiter might forward the request to the appropriate local access point for local processing. If the request has a cross-cluster impact, centralized access point 114 can invoke an atomic ownership control protocol to manage the cross-cluster entity metadata according to the herein disclosed techniques.

Specifically, the protocol can transfer ownership (e.g., read-write permissions) of the subject entity metadata (e.g., stored in local entity database $106_1$ and local entity database $106_N$) from local access points (e.g., local access point $104_1$ and local access point $104_N$) to centralized access point 114 (step 3). In some embodiments, the ownership transfer can be facilitated by certain atomic operations (e.g., compare-and-swap operations) so as to eliminate access conflicts with other access points. Centralized access point 114 then has sole control to fan out (e.g., to specific clusters) or to broadcast (e.g., to all clusters) the subject entity metadata updates to all associated clusters based at least in part on the received request (step 4).

The herein disclosed techniques can be used to facilitate a cluster migration as shown and described as pertains to FIG. 1B2.

FIG. 1B2 illustrates a local entity ownership transfer technique 1B200 as implemented in systems that facilitate synchronized entity management in multi-cluster distributed systems. As an option, one or more variations of local entity ownership transfer technique 1B200 or any aspect thereof may be implemented in the context of the architecture and functionality of the embodiments described herein. The local entity ownership transfer technique 1B200 or any aspect thereof may be implemented in any environment.

The earlier described representative clusters (e.g., cluster $102_1$, cluster $102_K$, and cluster $102_N$) in multi-cluster distributed system 110 are shown in FIG. 1B2 to illustrate an implementation of the herein disclosed techniques (e.g., comprising local entity ownership transfer technique 1B200) to facilitate a cluster migration operation (operation 122). Specifically, a request might be received at centralized access point 114 of cluster $102_K$ to migrate some or all of the entities of a source cluster (e.g., cluster $102_1$) to a target cluster (e.g., cluster $102_N$) (step 1). Centralized access point 114 can invoke an ownership (e.g., read-write permissions) transfer of the source entity metadata in local entity database $106_1$ from local access point $104_1$ (step 2) to facilitate a "sync" (e.g., responsive to a snapshot event, or a data change event, any other event) of the source entity metadata to centralized entity database 116 (step 3). Ownership (e.g., to write the source entity metadata to a set of target entity metadata in local entity database $106_N$) can be established at centralized access point 114 (step 4). Centralized access point 114 then has sole control to deliver the target entity metadata updates to local entity database $106_N$ (step 5). In some cases (e.g., when target cluster is stand-alone cluster), ownership can then be transferred from centralized access point 114 to local access point $104_N$ according to the herein disclosed techniques (step 6).

FIG. 1C is a flowchart 1C00 of operations as implemented in systems that facilitate synchronized entity management in multi-cluster distributed systems. As shown, a request might be received at target cluster (e.g., centralized access point 114 of cluster $102_K$) to migrate some or all of the entities of a source cluster (e.g., cluster $102_1$) to a target cluster (e.g., cluster $102_N$) (step 161). The target cluster facilitate in transferring metadata pertaining to the to-be-migrated entities (step 162). Sufficient privileges are applied or imputed by the centralized access point (e.g., at least READ permissions) such that the source entity metadata in local entity database $106_1$ can be snapshotted to capture its then-current state (step 163). Ownership (step 164) and privileges are applied or imputed by the centralized access point so as to be able to perform writes to the entity metadata as changes come in (step 165). Having established ownership and privileges, the centralized access point has sole control to broadcast entity metadata updates to any listeners (step 165). In some cases, a request to release ownership can be granted (decision 167), and ownership can be transferred from the centralized access point 114 to a local access point (step 166). With respect to the "No" branch of decision 167, broadcasting continues as changes to the entity metadata occur.

Figure 1D:
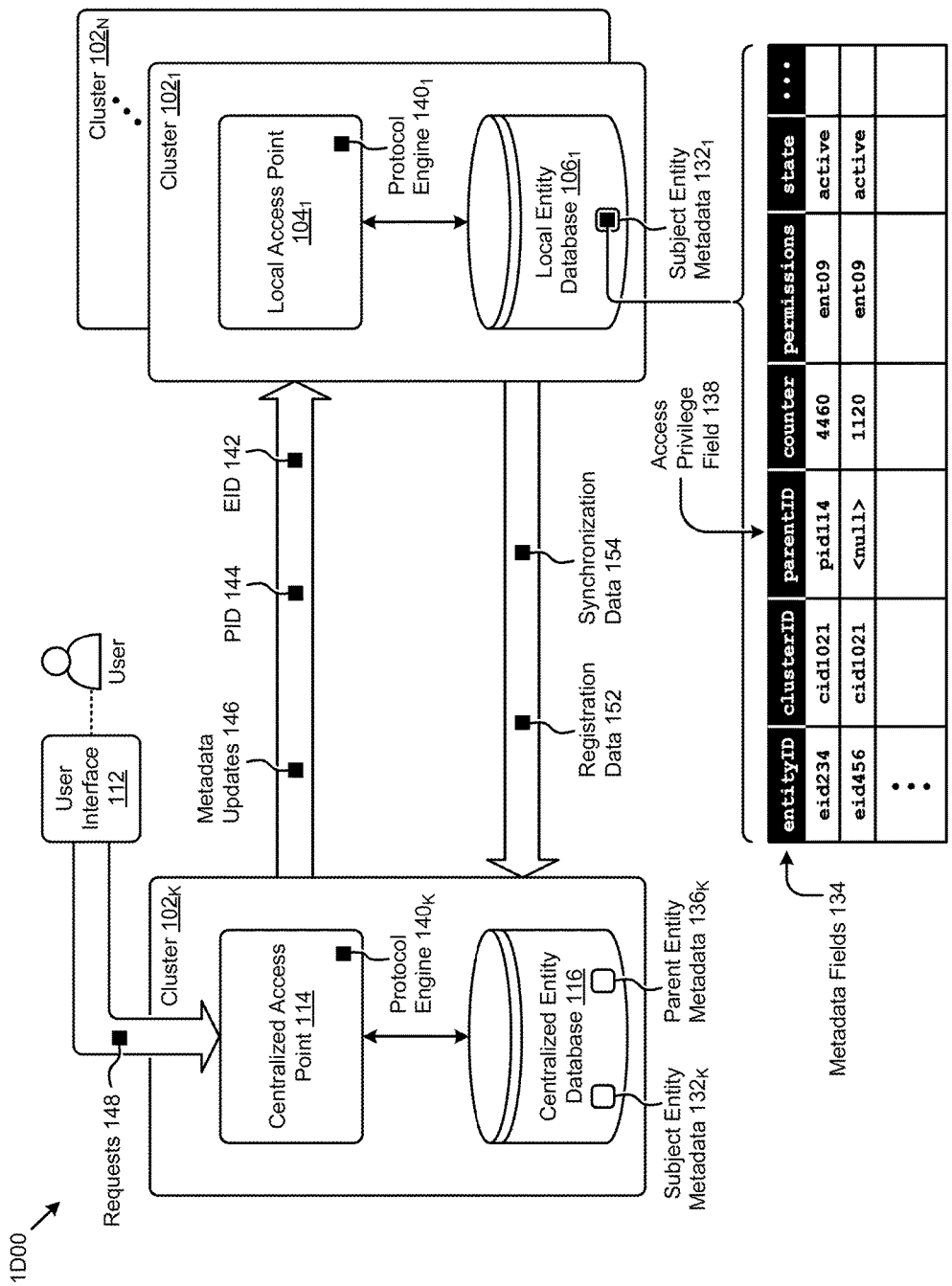
FIG. 1D is a diagram depicting data flows as implemented in systems that facilitate synchronized entity management in multi-cluster distributed systems, according to an embodiment.

Further details describing an embodiment of components, data flows, and data structures supporting the herein disclosed techniques are shown and described as pertains to FIG. 1D.

FIG. 1D is a diagram depicting data flows 1D00 as implemented in systems that facilitate synchronized entity management in multi-cluster distributed systems. As an option, one or more variations of data flows 1D00 or any aspect thereof may be implemented in the context of the architecture and functionality of the embodiments described herein. The data flows 1D00 or any aspect thereof may be implemented in any environment.

A set of representative clusters (e.g., cluster $102_1$, cluster $102_K$, and cluster $102_N$) in a multi-cluster distributed system are depicted in FIG. 1D. A user interface 112 is shown as interfacing with one particular cluster, specifically the cluster associated with centralized access point 114. User interface 112 can, for example, facilitate issuance of requests 148 by a user to perform certain operations pertaining to the multi-cluster distributed system, such as deployment of entities and/or clusters, performing entity operations (e.g., establishing a backup policy for virtual machines in an application running on multiple clusters, management of data policies, and/or other operations). User interface 112 might be an HTTP/HTML5 interface presented in a browser, a CLI, or a REST API accessed from another process. Alternatively, the entity operations can be carried out using a "git" or "svn" repository. As merely an example, a system administrator might use the user interface 112 to register the cluster $102_1$ in the multi-cluster distributed system. Responsive to the registration, a set of registration data 152 and an initial instance of synchronization data 154 might be collected in centralized entity database 116. Synchronization data 154, for example, might comprise a then-current snapshot of local entity database $106_1$.

When the requests 148 and/or processes initiated within the multi-cluster distributed system pertain to management of cross-cluster entities, certain actions implemented according to the herein disclosed techniques are invoked. In certain embodiments, such actions can be facilitated by instances of a protocol engine (e.g., protocol engine $140_1$, protocol engine $140_K$, etc.) instantiated at the access points in the clusters. As an example, a request to modify a set of subject entity metadata $132_1$ pertaining to the newly registered cluster (e.g., cluster $102_1$) might be detected. In response, a set of copy-controlled entity metadata (e.g., parent entity metadata $136_K$) can be created to hold later modified variations or instances of the subject entity metadata. A subject entity metadata identifier (e.g., EID 142) and a parent entity metadata identifier (e.g., PID 144) can be sent to each cluster (e.g., cluster $102_1$) associated with the subject entity metadata. Receiving the EID 142 and PID 144 at the protocol engine $140_1$ will trigger an insertion of an access privilege field 138 into the set of metadata fields 134 describing the subject entity metadata $132_1$. In some embodiments, the metadata fields 134 can correspond to columns in a data table, with the rows of the data table corresponding to a given entity. In this case, as can be observed, insertion of the access privilege field 138 can correspond to inserting a data table column name parentID.

Populating the parentID field with PID 144 (e.g., pid114) received from centralized access point 114 by protocol engine $140_1$ indicates an access ownership transfer of the associated entity metadata to centralized access point 114. Specifically, the parentID field serves to provide read-write access to the single access point that provided the parentID written to the field and read-only access to all other access points. To prevent conflicts with other access points and/or internal processes concurrently accessing the metadata for a given entity, writing to the parentID field can implemented as an atomic operation. Specifically, in certain embodiments, a compare-and-swap operation is used to write to the parentID field. For example, an access counter value can be used in a compare-and-swap operation to determine exclusive access to a set of entity metadata. Other fields (e.g., data table columns) in metadata fields 134 to describe the entity metadata can comprise an entity identifier or entityID, a cluster identifier or clusterID, a permissions indicator (e.g., corresponding to an enterprise access policy), an entity state indicator (e.g., active, disabled, pending deletion, etc.), and/or other attributes (e.g., date created, last modified, etc.).

When ownership control is transferred to centralized access point 114 by registering PID 144 (e.g., pid114) in the parentID field of subject entity metadata $132_1$, the parent entity metadata $136_K$ can be populated with the then-current snapshot or other form or format or representation of the subject entity metadata (e.g., subject entity metadata $132_K$) in centralized entity database 116. The modifications associated with the received request can then be applied to parent entity metadata $136_K$ to generate a set of updated parent entity metadata which, in turn, can be used to deliver a set of metadata updates 146 to update the subject entity metadata $132_1$. The foregoing protocol can be implemented for any clusters associated with the subject entity metadata.

The components, data flows, and data structures shown in FIG. 1D presents merely one partitioning and associated data manipulation approach. The specific example shown is purely exemplary, and other subsystems and/or partitioning are reasonable. One embodiment of an environment depicting such systems, subsystems, and/or partitionings is shown and described as pertaining to FIG. 2.

FIG. 2 presents a multi-cluster distributed environment 200 in which embodiments of the present disclosure can operate. As an option, one or more variations of multi-cluster distributed environment 200 or any aspect thereof may be implemented in the context of the architecture and functionality of the embodiments described herein. The multi-cluster distributed environment 200 or any aspect thereof may be implemented in any environment.

The multi-cluster distributed environment 200 shows various components associated with one instance of a multi-cluster distributed system (e.g., hyper-converged distributed system) comprising a distributed storage system 204 that can be used to implement the herein disclosed techniques. Specifically, the multi-cluster distributed environment 200 comprises multiple clusters (e.g., cluster $102_1$, . . . , cluster $102_N$) comprising multiple nodes (e.g., node $230_{11}$, . . . , node $230_{1M}$, node $230_{N1}$, . . . , node $230_{NM}$) that have multiple tiers of storage in a storage pool 270. For example, each node can be associated with one server, multiple servers, or portions of a server. The nodes can be associated (e.g., logically and/or physically) with the clusters. As shown, the multiple tiers of storage include storage that is accessible through a network 214, such as a networked storage 275 (e.g., a storage area network or SAN, network attached storage or NAS, etc.). The multiple tiers of storage further include instances of local storage (e.g., local storage $272_{11}$, . . . , local storage $272_{N1}$). For example, the local storage can be within or directly attached to a server and/or appliance associated with the nodes. Such local storage can include solid state drives (SSD $273_{11}$, . . . , SSD $273_{N1}$), hard disk drives (HDD $274_{11}$, . . . , HDD $274_{N1}$), and/or other storage devices. Specifically, the SSD storage might store instances of entity metadata (e.g., entity metadata $206_{11}$, . . . , entity metadata $206_{N1}$) managed according to the herein disclosed techniques.

As shown, the nodes in multi-cluster distributed environment 200 can implement one or more entities (e.g., entity $232_{111}$, . . . , entity $232_{11K}$, entity $232_{N11}$, . . . , $232_{N1K}$) for various purposes. For example, such entities might comprise user virtual machines (VMs) and/or application containers. The VMs can be characterized as software-based computing "machines" implemented in a full virtualization environment that emulates the underlying hardware resources (e.g., CPU, memory, etc.) of the nodes. For example, multiple VMs can operate on one physical machine (e.g., node host computer) running a single host operating system, while the VMs run multiple applications on various respective guest operating systems. Such flexibility can be facilitated at least in part by a hypervisor that is logically located between the various guest operating systems of the VMs and the host operating system of the physical infrastructure (e.g., node). As an example, hypervisors can be implemented using virtualization software (e.g., VMware ESXi, Microsoft Hyper-V, RedHat KVM, Nutanix AHV, etc.) that includes a hypervisor. In comparison, the application containers are implemented at the nodes in an operating system virtualization or container virtualization environment. The application containers comprise groups of processes and/or resources (e.g., memory, CPU, disk, etc.) that are isolated from the node host computer and other containers. Such containers directly interface with the kernel of the host operating system with, in most cases, no hypervisor layer. This lightweight implementation can facilitate efficient distribution of certain software components, such as applications or services (e.g., micro-services). Distributed systems in certain environments, such as multi-cluster distributed environment 200, can implement both a full virtualization environment and a container virtualization environment for various purposes. In some cases, multiple virtualization environments (e.g., full virtualization and operating system virtualization) can be implemented in a given node.

As can be observed, multi-cluster distributed environment 200 also comprises at least one entity that serves as a virtualized controller to facilitate access to storage pool 270 by the VMs, the application containers, and/or other entities of the distributed system. Multiple instances of such virtualized controllers can coordinate within a cluster to form the distributed storage system 204 which can, among other operations, manage the storage pool 270 and/or other resources in the system. This architecture further facilitates efficient scaling of the distributed virtualization system. The foregoing virtualized controllers can be implemented in multi-cluster distributed environment 200 using various techniques. Specifically, an instance of a virtual machine at a given node can be used as a virtualized controller in a full virtualization environment to manage storage resources and I/O activities. In this case, for example, the VMs at node $230_{11}$ can interface with virtualized controller $234_{11}$ implemented as a virtual machine through a hypervisor to access the storage pool 270. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 204. For example, a hypervisor at one node in the distributed storage system 204 might correspond to VMware ESXi software, and a hypervisor at another node in the distributed storage system 204 might correspond to Nutanix AHV software. As another virtualized controller implementation example, containers (e.g., Docker containers) can be used to implement a virtualized controller (e.g., virtualized controller $234_{N1}$) in an operating system virtualization environment at a given node. In this case, for example, the VMs at node $230_{N1}$ can access the storage pool 270 by interfacing with a controller container (e.g., virtualized controller $234_{N1}$) through a hypervisor at node $230_{N1}$ and/or the kernel of the host operating system of node $230_{N1}$.

In certain embodiments, the access points earlier mentioned can be implemented in the virtualized controllers. Specifically, as shown, an access point $204_{11}$ can be implemented in virtualized controller $234_{11}$ and an access point $204_{N1}$ can be implemented in virtualized controller $234_{N1}$. An elected leader from the access points running at each virtualized controller in a given cluster can serve as a local access point for the cluster. One leader access point from the clusters might further serve as a centralized access point for multiple clusters in multi-cluster distributed environment 200.

Further details regarding general approaches to leadership election are described in U.S. application Ser. No. 15/160,347 titled, "SCALABLE LEADERSHIP ELECTION IN A MULTI-PROCESSING COMPUTING ENVIRONMENT" filed on May 20, 2016, which is hereby incorporated by reference in its entirety.

In some cases, the foregoing collection of access points can coordinate to provide a distributed resource management platform to facilitate management and monitoring of the entities (e.g., objects) and/or services in the multi-cluster distributed environment 200. In such management platforms, the centralized access point can provide a single, centralized management interface for the multi-cluster system, while the local access points can support localized management and operations. In some cases, the centralized access point can receive requests (e.g., HTTP requests) and distribute them as appropriate to the local access points. For example, a user might access the centralized access point using an external IP address for the cluster (e.g., specified during configuration or DNS entry). The user might further access one or more of the local access points using the user interface of the centralized access point or by navigating to the IP address of the hosting virtualized controller.

Figure 3:
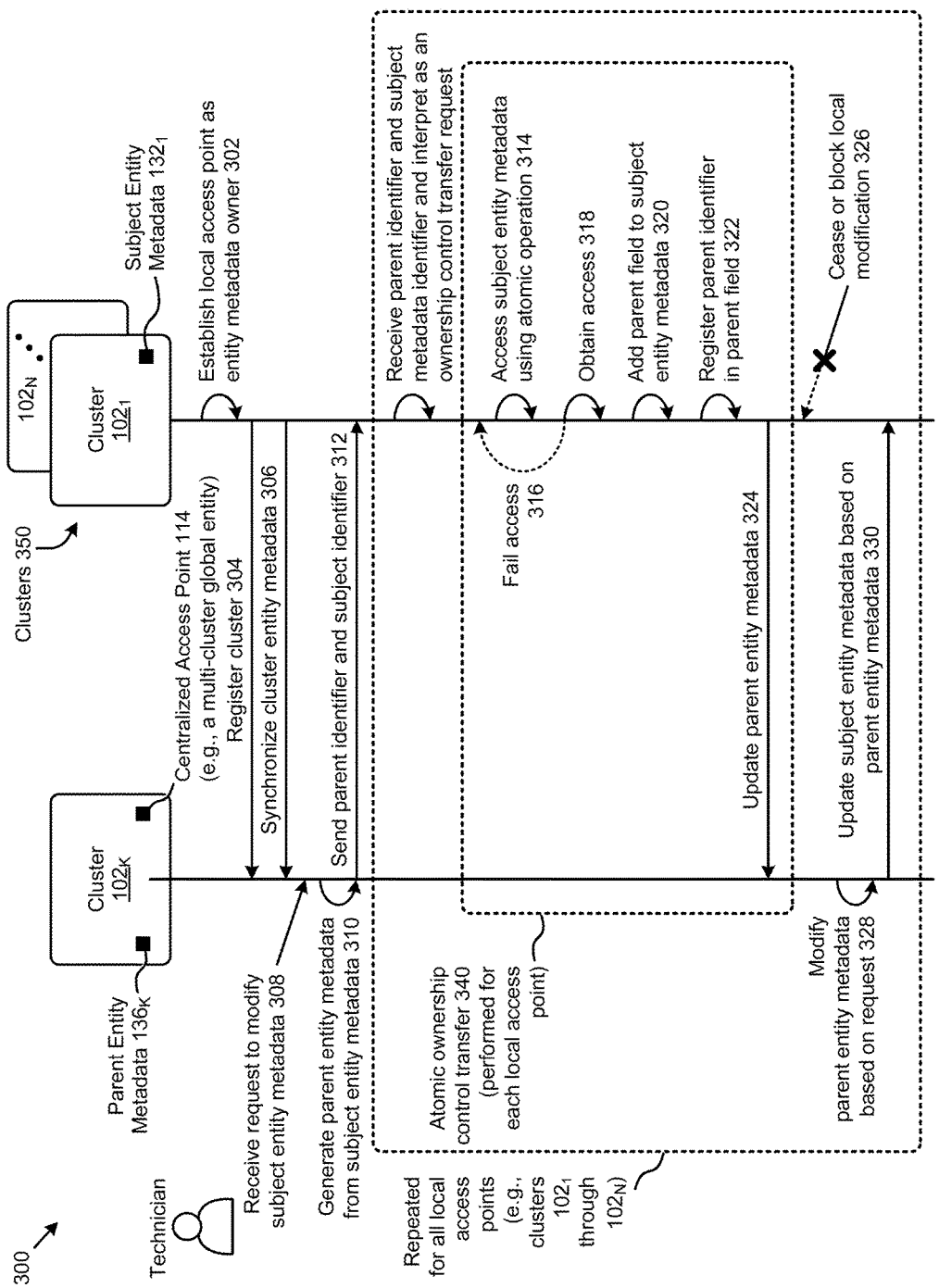

Examples of protocols that can be implemented in multi-cluster distributed environment 200 according to the herein disclosed techniques are presented and discussed as pertains to FIG. 3 and FIG. 4.

FIG. 3 is an interaction diagram showing an inter-component protocol 300 that facilitates centralized entity management using an entity ownership transfer from local access points to a centralized access point as implemented in systems for synchronized entity management in multi-cluster distributed systems. As an option, one or more variations of inter-component protocol 300 or any aspect thereof may be implemented in the context of the architecture and functionality of the embodiments described herein. The inter-component protocol 300 or any aspect thereof may be implemented in any environment.

Inter-component protocol 300 presents various multi-cluster distributed system components earlier described that can exhibit a set of high order interactions (e.g., operations, messages, etc.) to facilitate implementations of the herein disclosed techniques that comprise an entity ownership transfer from local access points to a centralized access point. Specifically shown are cluster $102_K$ comprising centralized access point 114, and a plurality of clusters 350 represented by cluster $102_1$. Any or all of the clusters 350 can interact with cluster $102_K$ as depicted in inter-component protocol 300. As shown, a local access point corresponding to cluster $102_1$ can be established at some moment in time (e.g., when the cluster is first formed) as the owner of the entity metadata for the cluster (operation 302). "Ownership" can comprise read-write privileges and/or other attributes. Upon registering the cluster $102_1$ with the centralized access point 114 (message 304), the entity metadata from cluster $102_1$ can be synchronized at cluster $102_K$ (message 306). A request might then be received at centralized access point 114 to modify a set of subject entity metadata in the clusters (input 308). For example, such subject entity metadata might comprise the subject entity metadata $132_1$ at cluster $102_1$. Responsive to receiving the request, a set of parent entity metadata can be generated (operation 310). For example, parent entity metadata $136_K$ might be created to have a structure and size corresponding to subject entity metadata $132_1$ so as to facilitate storing a later determined modified instance of the subject entity metadata. A subject entity metadata identifier (e.g., EID) and a parent entity metadata identifier (e.g., PID) can be sent to each cluster (e.g., cluster $102_1$) associated with the subject entity metadata (message 312). Receiving the EID and PID at cluster $102_1$ will trigger a set of operations (see grouping 340) to execute an atomic ownership control transfer process. Specifically, the ownership transfer can commence with attempting to provision access to subject entity metadata $132_1$ by centralized access point 114 using an atomic operation, such as a compare-and-swap operation (e.g., operation 314). A compare-and-swap operation or other operation to permit atomic behavior is used to prevent conflicts with other access points and/or internal processes concurrently accessing the subject entity metadata. Some access attempts can result in a failure (operation 316) which can invoke another access attempt (at operation 314). When access is successfully provisioned to centralized access point 114 (operation 318), the parent field can be added to the subject metadata (operation 320) and populated with the PID (operation 322). With the PID registered in the parent field, ownership of subject entity metadata $132_1$ is transferred to centralized access point 114 so as to provide read-write access to centralized access point 114 and read-only access to all other access points. Specifically, local modification requests are blocked (see input 326).

When ownership control is transferred to centralized access point 114, the parent entity metadata $136_K$ can be populated with the then-current snapshot of the subject entity metadata (message 324). The modifications associated with the received request can then be applied to parent entity metadata $136_K$ to generate a set of updated parent entity metadata (operation 328), which, in turn, can be used to update the subject entity metadata $132_1$ (message 330). As earlier mentioned, any of the foregoing operations and/or messages can be implemented for any clusters associated with the subject entity metadata.

A third party can request ownership of a multi-cluster global entity. If, at that moment in time there has not been a fan-out or broadcast pertaining to that entity, then the third-party request might be granted. However, if a fan-out or broadcast had already occurred, then if the third-party request is granted (e.g., so as to effect a new ownership), then the metadata copies of any non-owners are invalidated.

FIG. 4 is a diagrammatic representation of system component interactions 400 that facilitates entity ownership transfer from a centralized access point to a local access point as implemented in systems for synchronized entity management in multi-cluster distributed systems. As an option, one or more variations of system component interactions 400 or any aspect thereof may be implemented in the context of the architecture and functionality of the embodiments described herein. The system component interactions 400 or any aspect thereof may be implemented in any environment.

FIG. 4 presents various multi-cluster distributed system components earlier described that can exhibit a set of high order interactions (e.g., operations, messages, etc.) to facilitate implementations of the herein disclosed techniques that comprise an entity ownership transfer from a centralized access point to a local access point. Specifically shown are cluster $102_K$ comprising centralized access point 114, cluster $102_S$, and cluster $102_T$. As shown, a request might be received at centralized access point 114 to, for example, migrate the cluster $102_S$ (e.g., source cluster) to cluster $102_T$ (e.g., target cluster) (input 402). Such a migration can be facilitated, in part, by migrating the entity metadata of the source cluster to the entity database of the target cluster. In such cases, the source entity metadata (e.g., source entity metadata 431) is identified (operation 404). A set of target entity metadata can be generated at the target cluster (message 405). Further, a set of parent entity metadata can be generated at cluster $102_K$ (operation 406). For example, target entity metadata 432 and parent entity metadata $136_K$ might be created to have a structure and size corresponding to source entity metadata 431 so as to facilitate storing an instance of source entity metadata 431. A source entity metadata identifier and a parent entity metadata identifier can be sent to the source cluster (e.g., cluster $102_S$) (message 408) to trigger a set of operations to execute an atomic ownership control transfer of source entity metadata 431 to centralized access point 114 (message $410_1$). For example, such an atomic ownership control transfer process might correspond to grouping 340 earlier shown and described as pertaining to FIG. 3.

When ownership control of source entity metadata 431 is transferred to centralized access point 114, the parent entity metadata $136_K$ can be synchronized to the then-current snapshot of the source entity metadata (message 412). A target entity metadata identifier and a parent entity metadata identifier can then be sent to the target cluster (e.g., cluster $102_T$) (message 414) to trigger a set of operations to execute an atomic ownership control transfer of target entity metadata 432 to centralized access point 114 (message $410_2$). For example, such an atomic ownership control transfer process might correspond to grouping 340 earlier shown and described as pertaining to FIG. 3. A callback can be issued to centralized access point 114 when ownership is successfully transferred (message 416). The target entity metadata 432 can then be updated with the snapshot of the source entity metadata stored in parent entity metadata $136_K$ (message 418). In some cases, ownership control can be transferred back to the target cluster (e.g., cluster $102_T$) (message 420). For example, according to the herein disclosed techniques, ownership can be relinquished by centralized access point 114 by clearing the parentID field in target entity metadata 432.

ADDITIONAL EMBODIMENTS OF THE DISCLOSURE

Additional Practical Application Examples

Figure 5:
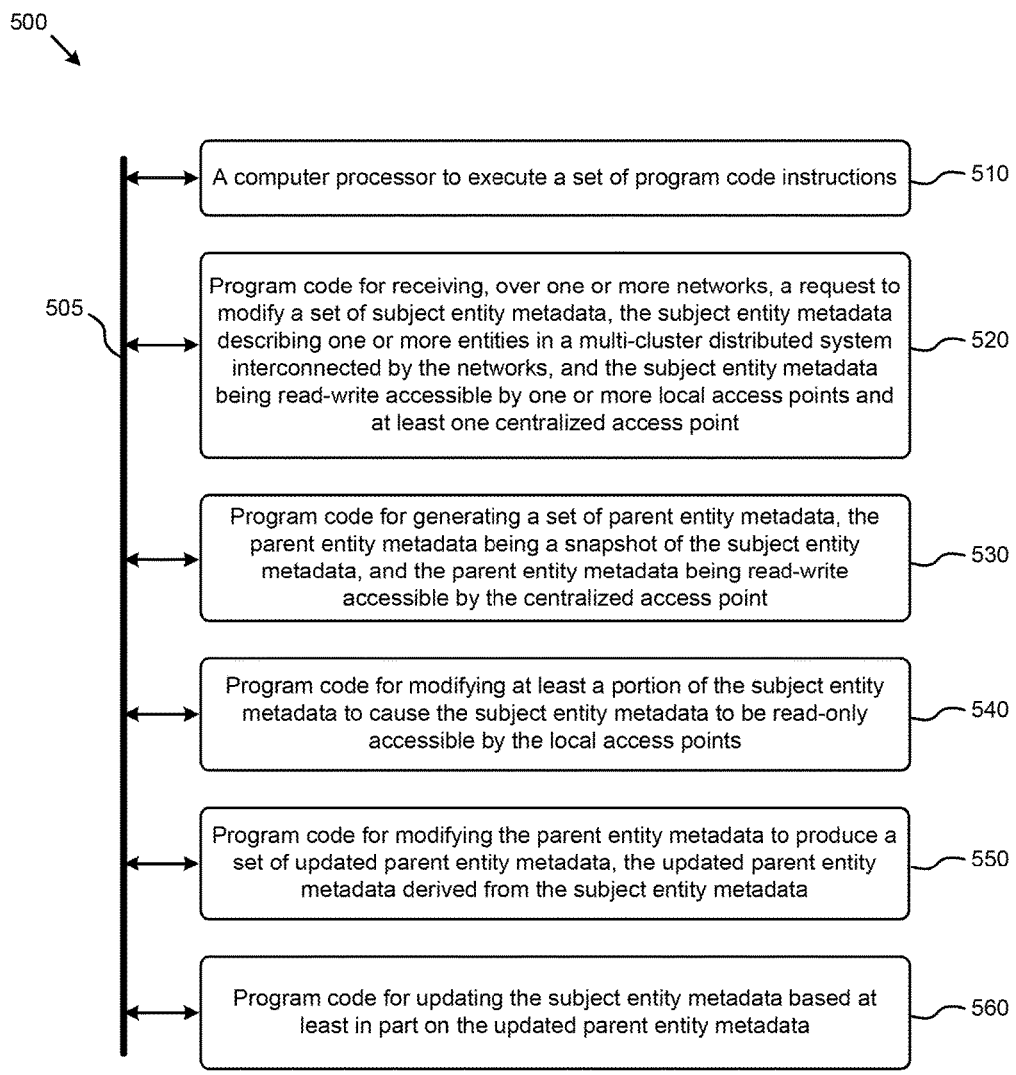
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The shown embodiment implements a portion of a computer system, presented as system 500, comprising a computer processor to execute a set of program code instructions (module 510) and modules for accessing memory to hold program code instructions to perform:

receiving, over one or more networks, a request to modify a set of subject entity metadata, the subject entity metadata describing one or more entities in a multi-cluster distributed system interconnected by the networks, and the subject entity metadata being read-write accessible by one or more local access points and at least one centralized access point (module 520); generating a set of parent entity metadata, the parent entity metadata being a snapshot of the subject entity metadata, and the parent entity metadata being read-write accessible by the centralized access point (module 530); modifying at least a portion of the subject entity metadata to cause the subject entity metadata to be read-only accessible by the local access points (module 540); modifying the parent entity metadata to produce a set of updated parent entity metadata, the updated parent entity metadata derived from the subject entity metadata (module 550); and updating the subject entity metadata based at least in part on the updated parent entity metadata (module 560).

Variations of the foregoing may include more or fewer of the shown modules and variations may perform more or fewer (or different) steps, and/or may use data elements in more, or in fewer (or different) operations.

System Architecture Overview

Additional System Architecture Examples

The disclosed embodiments can be implemented in accordance with various architectures. In particular, some architectures can be characterized as "distributed systems", having functional units that are hosted on network-connected devices that communicate and coordinate actions using messages sent over networks. Distributed systems often operate to pursue a coordinated goal, such as efficient use of shared resources or such as concentration of storage I/O. For example, a first set of components in a distributed computing system can coordinate to efficiently use a set of computational or compute resources, while other components in the distributed storage system coordinate to efficiently use a shared data storage facility. A hyperconverged system coordinates the efficient use of computing and storage resources that integrated for high-performance cooperation. The components of any of the foregoing distributed system architectures can comprise physically distributed autonomous entities (e.g., multiple nodes of a cluster). Some of the foregoing distributed system architectures comprise logically distributed autonomous entities (e.g., virtual machines running on a node). A hyperconverged cluster can comprise a group (e.g., an array) of physical computing nodes. Some systems and/or environments might be characterized as implementing certain aspects of virtualization. In a hypervisor-implemented virtualization environment, autonomous entities of a distributed system can be implemented as virtual machines running over a hypervisor. In an operating system virtualization environment, the autonomous entities of a distributed system can be implemented as containers. In some systems and/or environments, hypervisor-implemented virtualization and operating system virtualization can be combined.

Figure 6A:
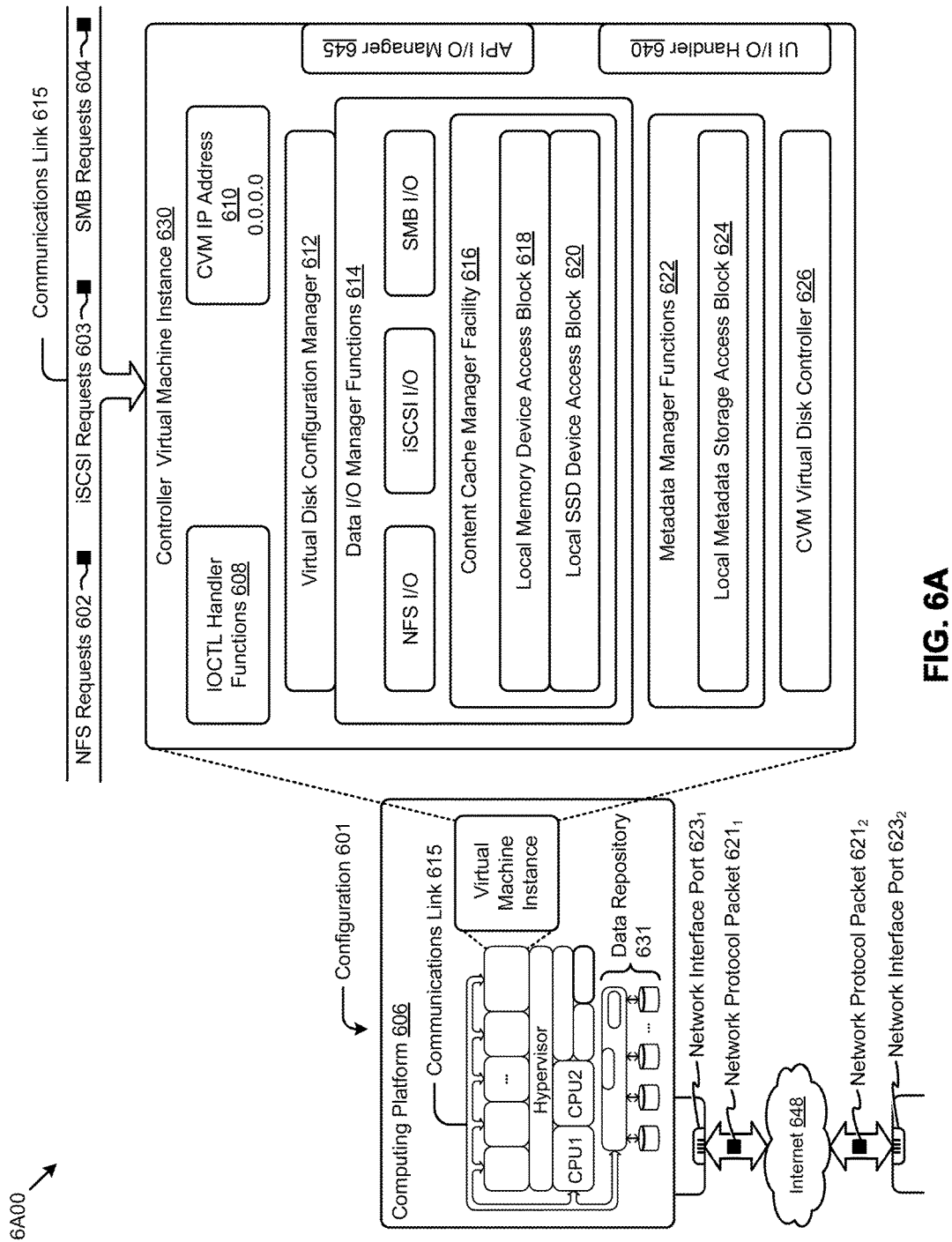
FIG. 6A and FIG. 6B depict virtualized controller architectures comprising collections of interconnected components suitable for implementing embodiments of the present disclosure and/or for use in the herein-described environments.

FIG. 6A depicts a virtualized controller as implemented by the shown virtual machine architecture 6A00. The virtual machine architecture comprises a collection of interconnected components suitable for implementing embodiments of the present disclosure and/or for use in the herein-described environments. Moreover, the shown virtual machine architecture 6A00 includes a virtual machine instance in a configuration 601 that is further described as pertaining to the controller virtual machine instance 630. A controller virtual machine instance receives block I/O (input/output or IO) storage requests as network file system (NFS) requests in the form of NFS requests 602, and/or internet small computer storage interface (iSCSI) block IO requests in the form of iSCSI requests 603, and/or Samba file system (SMB) requests in the form of SMB requests 604. The controller virtual machine (CVM) instance publishes and responds to an internet protocol (IP) address (e.g., CVM IP address 610). Various forms of input and output (I/O or IO) can be handled by one or more IO control handler functions (e.g., IOCTL functions 608) that interface to other functions such as data IO manager functions 614 and/or metadata manager functions 622. As shown, the data IO manager functions can include communication with a virtual disk configuration manager 612 and/or can include direct or indirect communication with any of various block IO functions (e.g., NFS IO, iSCSI IO, SMB IO, etc.).

In addition to block TO functions, the configuration 601 supports TO of any form (e.g., block TO, streaming TO, packet-based TO, HTTP traffic, etc.) through either or both of a user interface (UI) handler such as UI IO handler 640 and/or through any of a range of application programming interfaces (APIs), possibly through the shown API TO manager 645.

The communications link 615 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 630 includes a content cache manager facility 616 that accesses storage locations, possibly including local dynamic random access memory (DRAM) (e.g., through the local memory device access block 618) and/or possibly including accesses to local solid state storage (e.g., through local SSD device access block 620).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 631, which in turn can be formatted into any one or more storage areas, and which can comprise parameterized storage accessible by a key (e.g., a filename, a table name, a block address, an offset address, etc.). An external data repository 631 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 624. The external data repository 631 can be configured using a CVM virtual disk controller 626, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 601 can be coupled by a communications link 615 (e.g., backplane, LAN, PTSN, wired or wireless network, etc.) and each instance may perform respective portions of sequences of instructions as may be required to practice embodiments of the disclosure.

The shown computing platform 606 is interconnected to the Internet 648 through one or more network interface ports (e.g., network interface port 623$_1$ and network interface port 623$_2$). The configuration 601 can be addressed through one or more network interface ports using an IP address. Any operational element within computing platform 606 can perform sending and receiving operations using any of a range of network protocols, possibly including network protocols that send and receive packets (e.g., network protocol packet 621$_1$ and network protocol packet 621$_2$).

The computing platform 606 may transmit and receive messages that can be composed of configuration data, and/or any other forms of data and/or instructions organized into a data structure (e.g., communications packets). In some cases, the data structure includes program code instructions (e.g., application code) communicated through Internet 648 and/or through any one or more instances of communications link 615. Received program code may be processed and/or executed by a CPU as it is received and/or program code may be stored in any volatile or non-volatile storage for later execution. Program code can be transmitted via an upload (e.g., an upload from an access device over the Internet 648 to computing platform 606). Further, program code and/or results of executing program code can be delivered to a particular user via a download (e.g., a download from the computing platform 606 over the Internet 648 to an access device).

The configuration 601 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster is defined by a mechanical structure such as a cabinet or chassis or rack that hosts a finite number of mounted-in computing units. A computing unit in a rack can take on a role as a server, or as a storage unit, or as a networking unit, or any combination therefrom. In some cases a unit in a rack is dedicated to provision of power to the other units. In some cases a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one another over a WAN (e.g., when geographically distal) or LAN (e.g., when geographically proximal).

A module as used herein can be implemented using any mix of any portions of the system memory and any extent of hard-wired circuitry including hard-wired circuitry embodied as a data processor. Some embodiments of a module include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to synchronized entity management in multi-cluster distributed systems. In some embodiments, a module may include one or more state machines and/or combinational logic used to implement or facilitate the operational and/or performance characteristics pertaining to synchronized entity management in multi-cluster distributed systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of synchronized entity management in multi-cluster distributed systems). Such files or records can be brought into and/or stored in volatile or non-volatile memory.

Figure 6B:
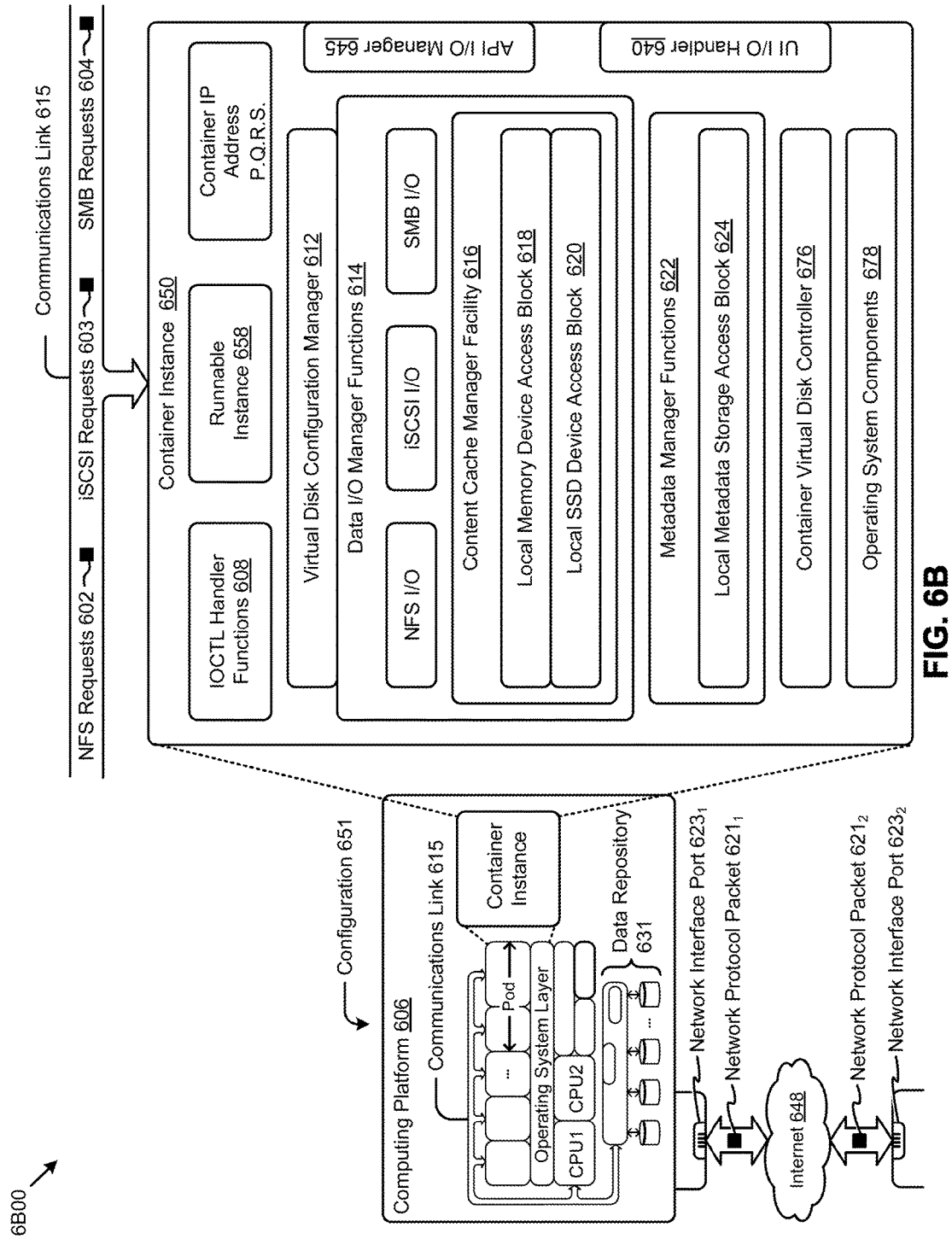

FIG. 6B depicts a virtualized controller implemented by a containerized architecture 6B00. The containerized architecture comprises a collection of interconnected components suitable for implementing embodiments of the present disclosure and/or for use in the herein-described environments. Moreover, the shown containerized architecture 6B00 includes a container instance in a configuration 651 that is further described as pertaining to the container instance 650. The configuration 651 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 650). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls -a", etc.). The container might optionally include operating system components 678, however such a separate set of operating system components need not be provided. As an alternative, a container can include a runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 676. Such a container virtual disk controller can perform any of the functions that the aforementioned CVM virtual disk controller 626 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
   forming, by a node in a first cluster, a migration request to migrate subject entity metadata;
   receiving, by a second cluster, the migration request to migrate the subject entity metadata to a cluster other than the first cluster;
   generating parent entity metadata, the parent entity metadata being a current representation of the subject entity metadata that is delivered to a central access point within the second cluster, wherein read-write access by the central access point is granted by receipt of the migration request;
   modifying, by the first cluster, at least a portion of the subject entity metadata to cause the subject entity metadata to be read-only accessible by the first cluster;
   receiving, by the second cluster, a request to modify the parent entity metadata;
   modifying the parent entity metadata to produce updated parent entity metadata; and
   sending, by the second cluster, at least a portion of the updated parent entity metadata.

2. The method of claim 1, further comprising modifying at least a portion of the subject entity metadata to cause the subject entity metadata to be read-write accessible by a local access point.

3. The method of claim 1, wherein generating the parent entity metadata is responsive to registering the first cluster or the second cluster with the central access point.

4. The method of claim 1, wherein the subject entity metadata is distributed across two or more clusters.

5. The method of claim 1, wherein the central access point is selected from any node of the second cluster.

6. The method of claim 1, wherein modifying the portion of the subject entity metadata comprises performing at least one atomic operation.

7. The method of claim 1, wherein modifying the portion of the subject entity metadata comprises is a compare-and-swap operation.

8. The method of claim 1, wherein modifying the portion of the subject entity metadata comprises adding a parent field to the subject entity metadata, and populating the parent field.

9. The method of claim 1, wherein modifying the portion of the subject entity metadata comprises adding a parent field to the subject entity metadata, and populating the parent field is populated with a parent entity metadata identifier.

10. The method of claim 1, wherein the request is invoked by at least one of, a cluster expansion, or a cluster migration.

11. A non-transitory computer readable medium having stored thereon a sequence of instructions which, when executed by a processor performs a set of acts, comprising:
    forming, by a node in a first cluster, a migration request to migrate subject entity metadata;
    receiving, by a second cluster, the migration request to migrate the subject entity metadata to a cluster other than the first cluster;
    generating parent entity metadata, the parent entity metadata being a current representation of the subject entity metadata that is delivered to a central access point within the second cluster, wherein read-write access by the central access point is granted by receipt of the migration request;

modifying, by the first cluster, at least a portion of the subject entity metadata to cause the subject entity metadata to be read-only accessible by the first cluster;

receiving, by the second cluster, a request to modify the parent entity metadata;

modifying the parent entity metadata to produce updated parent entity metadata; and sending, by the second cluster, at least a portion of the updated parent entity metadata.

12. The computer readable medium of claim 11, wherein the set of acts further comprise modifying at least a portion of the subject entity metadata to cause the subject entity metadata to be read-write accessible by a local access point.

13. The computer readable medium of claim 11, wherein generating the parent entity metadata is responsive to registering the first cluster or the second cluster with the central access point.

14. The computer readable medium of claim 11, wherein the subject entity metadata is distributed across two or more clusters.

15. The computer readable medium of claim 11, wherein the central access point is selected from any node of the second cluster.

16. The computer readable medium of claim 11, wherein modifying the portion of the subject entity metadata comprises performing at least one atomic operation.

17. The computer readable medium of claim 11, wherein modifying the portion of the subject entity metadata comprises is a compare-and-swap operation.

18. The computer readable medium of claim 11, wherein modifying the portion of the subject entity metadata comprises adding a parent field to the subject entity metadata, and populating the parent field.

19. A system, comprising:
a storage medium having stored thereon a sequence of instructions; and
a processor executes the sequence of instructions to to perform a set of acts, comprising,
  forming, by a node in a first cluster, a migration request to migrate subject entity metadata;
  receiving, by a second cluster, the migration request to migrate the subject entity metadata to a cluster other than the first cluster;
  generating parent entity metadata, the parent entity metadata being a current representation of the subject entity metadata that is delivered to a central access point within the second cluster, wherein read-write access by the central access point is granted by receipt of the migration request;
  modifying, by the first cluster, at least a portion of the subject entity metadata to cause the subject entity metadata to be read-only accessible by the first cluster;
  receiving, by the second cluster, a request to modify the parent entity metadata;
  modifying the parent entity metadata to produce updated parent entity metadata; and
  sending, by the second cluster, at least a portion of the updated parent entity metadata.

20. The system of claim 19, further comprising modifying at least a portion of the subject entity metadata to cause the subject entity metadata to be read-write accessible by a local access point.

21. A method, comprising:
forming, by a node in a first cluster, a request to relocate subject entity metadata;
receiving, by a second cluster, the request to relocate the subject entity metadata to a cluster other than the first cluster;
generating parent entity metadata, the parent entity metadata being a current representation of the subject entity metadata that is delivered to a central access point within the second cluster, wherein read-write access by the central access point is granted by receipt of the request;
modifying, by the first cluster, at least a portion of the subject entity metadata to cause the subject entity metadata to be read-only accessible by the first cluster;
receiving, by the second cluster, a request to modify the parent entity metadata;
modifying the parent entity metadata to produce updated parent entity metadata; and
sending, by the second cluster, at least a portion of the updated parent entity metadata.

22. The method of claim 21, further comprising modifying at least a portion of the subject entity metadata to cause the subject entity metadata to be read-write accessible by a local access point.

23. The method of claim 21, wherein generating the parent entity metadata is responsive to registering the first cluster or the second cluster with the central access point.

24. The method of claim 21, wherein the subject entity metadata is distributed across two or more clusters.

25. The method of claim 21, wherein the central access point is selected from any node of the second cluster.

* * * * *